United States Patent
Gleason et al.

(10) Patent No.: US 11,487,186 B2
(45) Date of Patent: Nov. 1, 2022

(54) PHOTOGRAPHY BACKDROP SUPPORT APPARATUS AND SYSTEMS

(71) Applicant: Replica Surfaces, LLC, Wichita Falls, TX (US)

(72) Inventors: Miranda Gleason, Dallas, TX (US); Adam Gleason, Dallas, TX (US); Chase Sagum, Wichita Falls, TX (US)

(73) Assignee: REPLICA SURFACES, LLC, Wichita Falls, TX (US)

( * ) Notice: Subject to any disclaimer, the term of this patent is extended or adjusted under 35 U.S.C. 154(b) by 0 days.

(21) Appl. No.: 17/739,044

(22) Filed: May 6, 2022

(65) Prior Publication Data
US 2022/0260893 A1    Aug. 18, 2022

Related U.S. Application Data

(60) Provisional application No. 63/186,441, filed on May 10, 2021, provisional application No. 63/236,976, filed on Aug. 25, 2021.

(51) Int. Cl.
| | |
|---|---|
| *G03B 15/06* | (2021.01) |
| *F16M 13/00* | (2006.01) |
| *F16M 11/02* | (2006.01) |
| *F16M 11/24* | (2006.01) |
| *F16M 11/28* | (2006.01) |

(52) U.S. Cl.
CPC ............ *G03B 15/06* (2013.01); *F16M 11/02* (2013.01); *F16M 11/242* (2013.01); *F16M 11/28* (2013.01); *F16M 13/00* (2013.01)

(58) Field of Classification Search
CPC ........ G03B 15/06; G03B 15/08; G03B 15/10; F16M 11/02; F16M 13/00; F16M 13/025
See application file for complete search history.

(56) References Cited

U.S. PATENT DOCUMENTS

| | | | |
|---|---|---|---|
| 8,472,000 B1* | 6/2013 | Lemmon | G03B 15/06 352/52 |
| 2007/0131825 A1* | 6/2007 | Skrodzki | F16M 11/16 248/177.1 |

FOREIGN PATENT DOCUMENTS

CN    110161778 A * 8/2019 ............. G03B 15/06

OTHER PUBLICATIONS https://www.amazon.com/dp/B08M61VJRV?ref=vse_pfo_vwdp Youngerfoto Photo Backdrop Bracket for Youngerfoto Board, Backdrop Brackets for Flat Lay or Food Photography Background Oct. 29, 2020 (Year: 2020).*

* cited by examiner

*Primary Examiner* — Christopher E Mahoney
(74) *Attorney, Agent, or Firm* — David A. Jones; Nadesan Beck P.C.

(57) ABSTRACT

Photography backdrop support apparatus and systems can include improvements in portability for a photographic backdrop support structures. In some embodiments, the improved photographic support structure can support up to three vertical surfaces around one horizontal surface. A photographic backdrop system support structure can be designed to support additional accessories and light sources to provide versatility in lighting and other photographic optimizations. Other attachable accessories can include a staging table, camera mount and/or lighting mount. The size and portability of the photographic backdrop system can be optimized in size and can be made to optimize the portability of the system while allowing for ample space to photograph objects the size of food such as fruit and vegetables, for example.

26 Claims, 23 Drawing Sheets

PHOTOGRAPHY BACKDROP SUPPORT APPARATUS AND SYSTEMS

CROSS-REFERENCE TO RELATED APPLICATIONS

This application claims priority to and the benefit of U.S. provisional patent application 63/186,441 filed May 10, 2021. This application also claims priority to and the benefit of U.S. provisional patent application 63/236,976 filed Aug. 25, 2021. The content of both of the aforementioned provisional patent applications are hereby incorporated herein by reference in their entirety and for all purposes.

BACKGROUND OF THE INVENTION

Prior to launching a successful photography backdrop company in 2018 the inventor Miranda Gleason of this patent application had little experience in photography or photograph layout styling experience. However, she began finding spare time after work to design products and found the need to take high-quality product photos and video. Unfortunately, she did not have good natural light in her apartment and her kitchen countertop was not having the right look. What she needed was a lightweight, realistic backdrop to aid in taking photographs outside or next to a window to obtain proper lighting of the photographed arrangement.

Mrs. Gleason scoured the internet but couldn't find a photography backdrop that had all the qualities and features that she needed. For example, vinyl is reflective and curls, and contact paper creases. Real marble and wood look great, but they stain, are heavy, and expensive. This is when she set out to create the backdrop system she was looking for. Thanks to a successful Kickstarter campaign in late 2018 her new company, photography backdrop products, and innovative designs became a success. As the inventor discovered, others had the same desire to showcase food and products; for example, along with quality photographs using an affordable high quality backdrop system. However, there remains a need for improved photographic backdrop innovations as discussed hereinafter.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

Photographic backdrop systems and support apparatus disclosed herein can include improvements in portability for photographic backdrop support structures. In some embodiments, the improved photographic support structures can support up to three vertical surfaces around one horizontal surface. A photographic backdrop support structure can be designed to support additional accessories and light sources to provide versatility in lighting and other photographic optimizations. Other attachable accessories can include a staging table, camera mount and/or lighting mount. In some embodiments, the size and portability of the photographic back drop system can be optimized in size and can be made to optimize the portability of the system while allowing for ample space to photograph objects the size of food such as fruit and vegetables, for example. A support structure for a photographic backdrop system is configured to support a horizontal backdrop panel and one or more vertical backdrop panels during photography.

The photographic backdrop support structure can include a base, or a recessed base with a perimeter, for supporting a bottom surface of the horizontal backdrop panel and a plurality of slots disposed about a periphery of the base, the plurality of slots configured to locate and support the one or more vertical backdrop panels.

The support structure for a photographic backdrop system can include a base including brackets disposed on two or more corners for receiving and aligning the horizontal panels relative to the base, the brackets comprising the plurality of slots configured to locate and support the one or more vertical backdrop panels.

The brackets can include a corner fitting extending from a top surface of the brackets, the corner fitting aligning the horizontal panel when the horizontal panel is placed upon the base. Each slot can extend from a corner fitting of a bracket along two perpendicular edges of the base support for supporting two vertical panels.

A backdrop system can include the support. The backdrop system can further include at least one vertical backdrop panel and a base backdrop panel. For example, the backdrop system can include two vertical backdrop panels and a horizontal backdrop panel. The one or more vertical backdrop panels can be supported by the support structure. For example, at least two vertical backdrop panels can extend perpendicular to one another and perpendicular to the horizontal backdrop panel to create a corner scene for photography when placed in the slots according to some embodiments.

Each bracket can include two sunken slots extending below the base. The sunken slots of the brackets can extend along two edges of the base support structure. The sunken slots can be recessed below a top of the base support structure.

A height of the corner fitting can extend above a top surface of the base corresponding to a width of the horizontal panel. The height of the corner fitting can be between about 1 and 10 millimeters. The height of the corner fitting being between about 2 and 3 millimeters. The height of the corner fitting and thickness of the horizontal backdrop panel can be about 2.5 millimeters.

The photographic backdrop support structure can include one or more support legs extending from the base structure. The support structure can include a tripod support structure coupled to the base support structure, the tripod including three legs. The tripod can be connectable to and disconnectable from the base support structure.

The support structure can include a connectable and disconnectable handle. The handle can be configured to support an accessory. The accessory can include a light and/or camera.

A surface of the horizontal and vertical photographic backdrop panels can have the appearance of wood, stone, smoke, marble, clay, tile, slate, concrete, sandstone, cement, plaster, linen, lights, for example, as well as other surface appearances.

The horizontal panel and/or vertical panels can be square. The horizontal and/or vertical being about 23 inches in length and/or about 23 inches in width, for example. The horizontal panel and/or vertical panel can weigh about 2 pounds with about a 0.12-inch thickness, according to one example embodiment. Other dimensions are also disclosed herein for example and can be implemented according to the teachings disclosed herein.

A method of using the photographic backdrop system can include assembling the support structure by expanding and connecting one or more legs to a base and assembling the horizontal panel and one or more panels with the base to create a backdrop scene for the photography.

A photographic backdrop support structure can include a base for supporting a horizontal backdrop panel and at least two vertical backdrop panels. The base can include a bracket, the bracket can include a corner fitting extending above the bracket for aligning a corner of the horizontal backdrop panel and two sunken slots for receiving an edge of two vertical backdrop panels. The two sunken slots can be disposed perpendicular to each other about a corner of the base.

The photographic backdrop support structure can include at least three brackets each bracket with a corner fitting extending above the bracket for aligning a corner of the horizontal backdrop panel two sunken slots for receiving an edge of two vertical backdrop panels.

A photographic backdrop support structure can include a base. The base can include a recessed portion, a perimeter portion, and brackets extending below the base recessed and perimeter portions. The brackets can connect the recessed portion to the perimeter portion and maintain four perimeter slots between the recessed portion and the perimeter portion for receiving and aligning a horizontal backdrop panel relative to at least two vertical backdrop panels.

The slots between the recessed portion and the perimeter portion maintained by the brackets are between about 2 and 3 millimeters wide, for example. The brackets can maintain a recessed slot for receiving a vertical backdrop panel, for example.

BRIEF DESCRIPTION OF THE DRAWINGS

FIGS. 1-5 and 7-12 illustrate a connectable handle of the support structure;

FIGS. 9 and 10 illustrate the handle being configured to support an accessory;

FIG. 10 illustrates the handle with pre-drilled holes for attachment of an accessory support;

FIG. 11 illustrates an embodiment where the brackets include threaded inserts to secure to and support the accessory support;

FIG. 12 illustrates an embodiment of a backdrop system that includes a support structure with a tripod which is further collapsible via two lockable collars 116;

DETAILED DESCRIPTION

Photographic backdrop systems and support apparatus disclosed herein can include improvements in portability for a photographic backdrop support structures. In some embodiments, an improved photographic support structure can support up to three vertical surfaces around one horizontal surface. A photographic backdrop support structure can be designed to support additional accessories and light sources to provide versatility in lighting and other photographic optimizations. Other attachable accessories can include a staging table, camera mount and/or lighting mount.

In some embodiments, the size and portability of the photographic back drop system can be optimized in size and can be made to optimize the portability of the system while allowing for ample space to photograph objects the size of food such as fruit and vegetables, products (e.g. candles), and other objects, for example. Other purposes and arrangements can relate to home product photography sold online, such as products sold on Etsy. According to some example embodiments, the size of the backdrop surfaces can be relatively large yet portable, such as twenty-three inches by twenty-three inches according to some example embodiments. Other sizes of embodiments can be varied by 5% to 50%, for example and as further explained toward the end of this detailed description. The surface represented can have the appearance of wood, stone, smoke, marble, clay, tile, slate, concrete, sandstone, cement, plaster, linen, lights, and other surface representations, for example, according to various embodiments.

Preferably, the support structure includes a form that is easy to use, adaptable, and long lasting. The support structure preferably is as compact as possible while maintaining form and function. According to some embodiments, the support structure can include a tripod support structure having an adjustable height as illustrated in the figures, for example.

According to some embodiments, the support structure can be configured to add or have an accessory table to place props when not in the photo. Such accessory table can be coupled to a tripod by an arm connectable to the neck of the tripod, for example, or built into a base of the support structure.

The support structure can be connectable to, and provide support for, an overhead camera, a phone, and/or lights, for example. The platform can also be connectable or connected to a handle, arm, bracket or other connectable and disconnectable structures. The handle or arm can be connectable or connected to an accessory and/or the accessory can be connectable or connected to a platform, base or perimeter portion. The platform can also be referred to herein and in the figures as a table, base, or support surface for aligning, supporting, and arranging the backdrop surfaces relative to one another.

Figure 1:
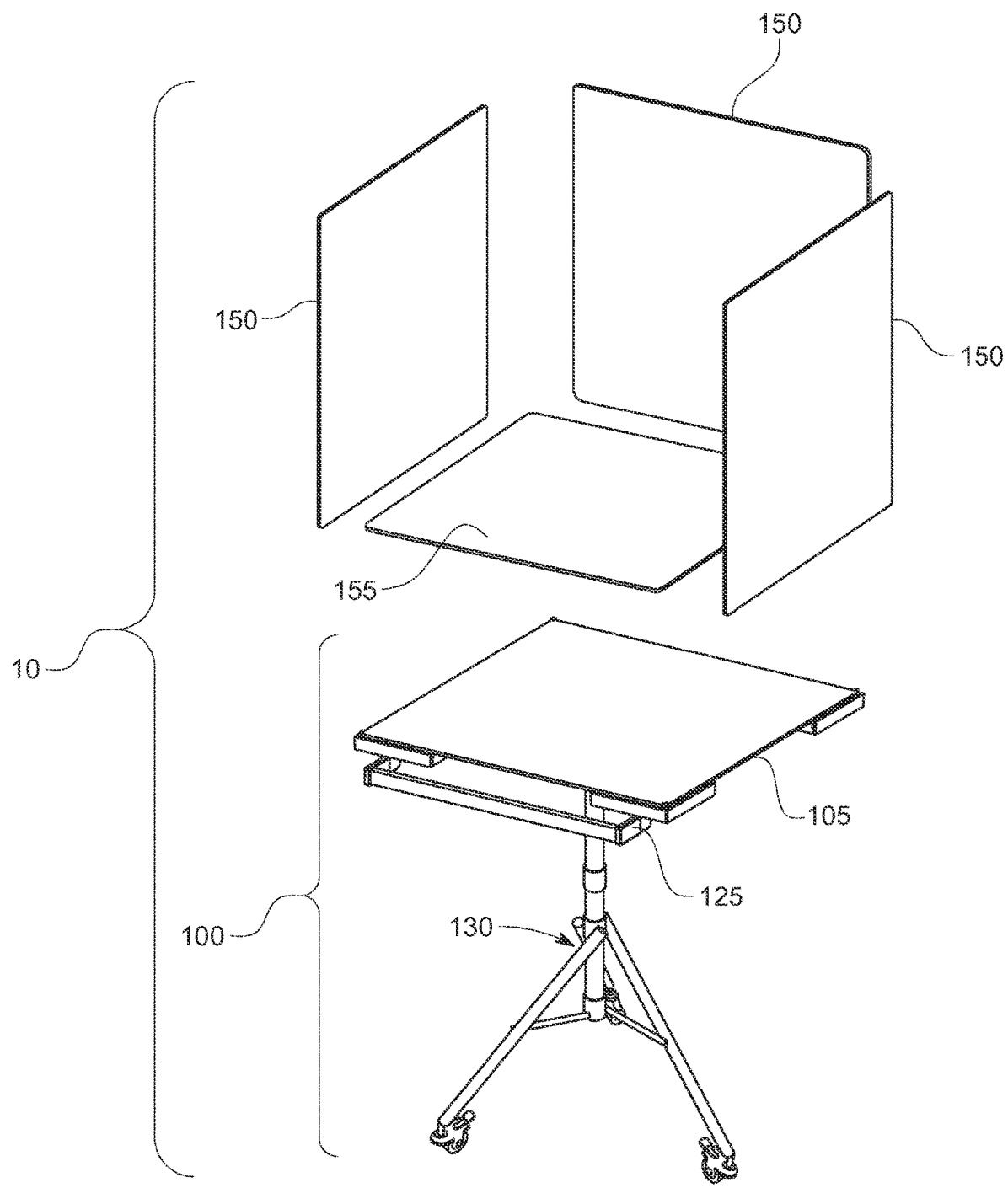
FIG. 1 illustrates a photographic backdrop system according to an embodiment of the invention.

Referring to FIG. 1, a backdrop system 10 is illustrated according to an embodiment of the invention. The backdrop system 10 includes a support structure 100 configured to support a horizontal panel 155 and one or more vertical panels 150 during photography. The support structure 100 includes a base 105 for supporting the horizontal panel 155 and the vertical panels 150. The support structure 100 further includes a tripod stand 130. The support structure 100 can further includes a handle 125 according to this example embodiment.

Figure 2:
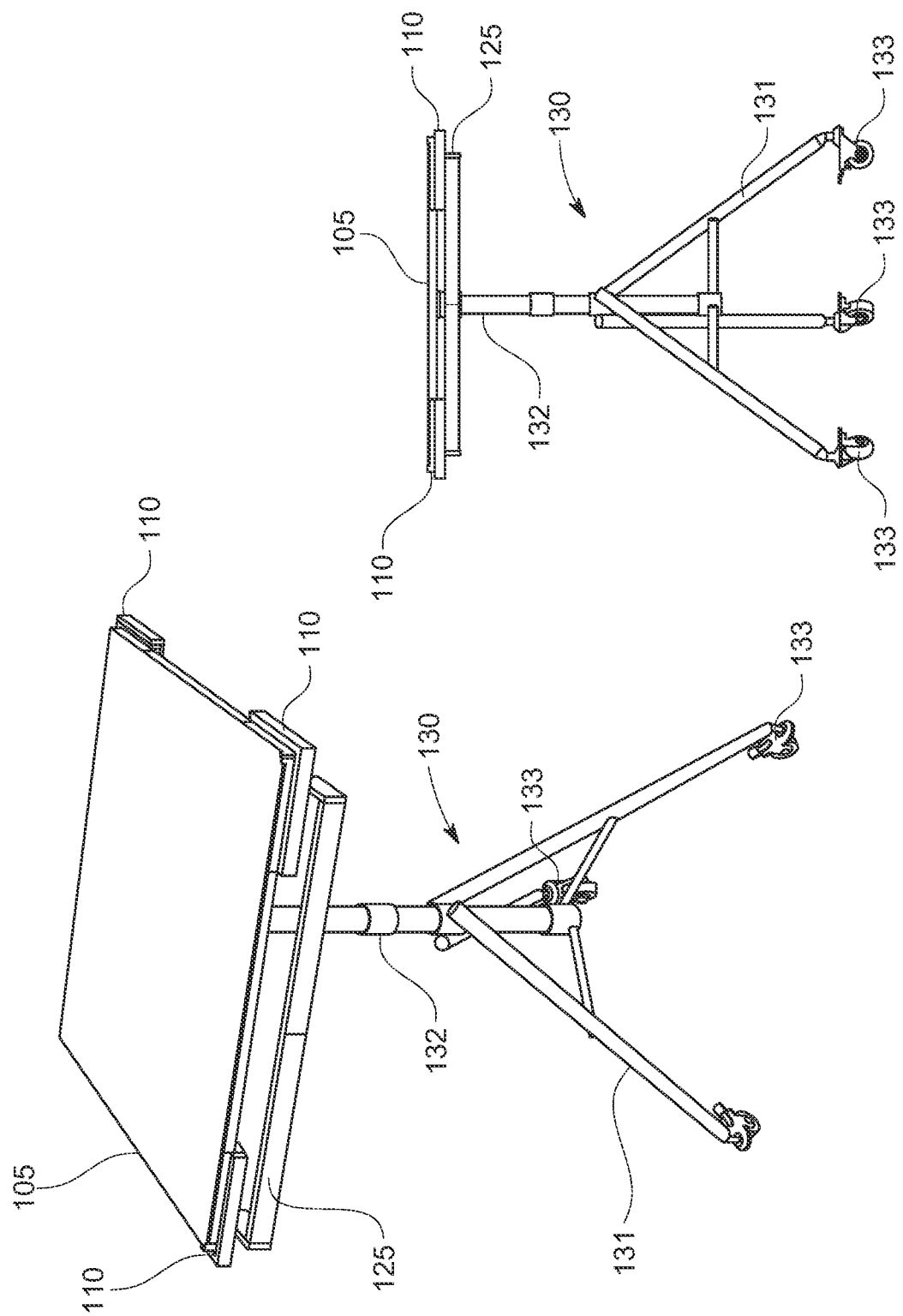
FIGS. 2 and 3 illustrate a photographic backdrop support structure according to an embodiment of the invention.
Figure 3:
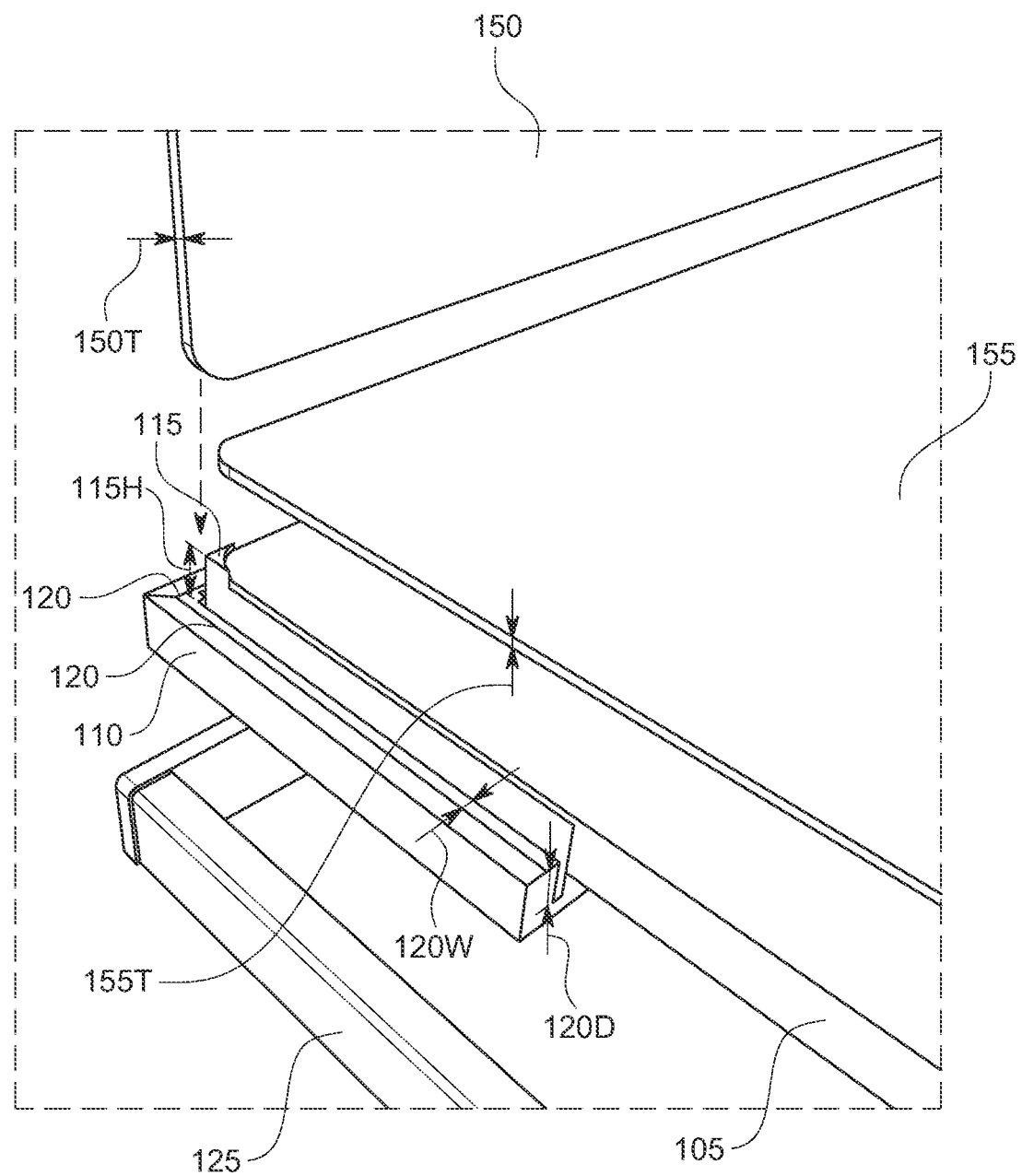

Referring to FIGS. 2 and 3, the base 105 includes brackets 110 disposed on two or more corners, preferably all four corners as shown, for receiving and aligning the horizontal panel 155 (see FIG. 1) and the vertical panels 150 (see FIG. 1) relative to the base 105. The brackets 110 including a corner fitting 115 extending above the brackets 110 the corner fitting 115, also referred to as a bracket nob, aligning the horizontal panel 155 when the horizontal panel 155 is placed upon the base 105. Each bracket 110 extending from the corner fitting 115 of the bracket 110 along two perpendicular sides of the base 105 for supporting two vertical panels 150.

The brackets 110 can include sunken slots 120 for insertion of the vertical panels 150 relative to the base 105, relative to the horizontal panel 155, and relative to adjacent perpendicularly placed vertical panels 150 as shown in FIG. 3 (see also FIG. 1). Two vertical panels 150 extend perpendicular to each other to create a corner for photography when placed in the slots 120. As shown in FIG. 3, the slots 120 extending below the base support a depth to align the edge of the horizontal panel 155 with the vertical panel 150 disposed therein. The portion of the brackets 110 extending along one or more sides of the base 105 structure being recessed below a top of the base 105 structure having a width corresponding with a thickness of the vertical panels 150.

As shown in FIG. 3, the depth 120D of the slots 120 defined by the depth of the brackets 110 extends below the bottom surface of the base portions 105 and can have a depth 120D sufficient for aligning the supported vertical panels 150 relative to other perpendicular vertical panels 150, relative to the horizontal panel 155, and corresponding to a width of the vertical panels 150 to prevent the slots 120 from being seen during photography. Depth 120D can be between about 10 and 40 millimeters, between about 20 and 30 millimeters, about 20 millimeters, and/or about 25 millimeters.

The height 115H of the corner fittings 115 extends above a top surface of the base 105 and can have a height 115H corresponding with a thickness 1555T of the horizontal panel 155 and aligning with a top surface of the horizontal panel 155. The height 115H of the corner fittings 115 corresponding to the thickness 155T of the horizontal panel 155 to prevent the corner fitting 115 from being seen during photography. For example, the dimensions of 155T, 150T, 120W and height 115H can the same in some embodiments, such as be between about 1 and 5 millimeters, between about 2 and 3 millimeters, between about 2.4 and 2.6 millimeters, or about 2.5 millimeters.

The support structure 100 can include one or more legs extending therefrom. The one or more legs can be part of the tripod 130 in some embodiments. The tripod 130 including three legs 131 and a central post 132 for attaching the tripod 130 to the base 105.

Figure 4:
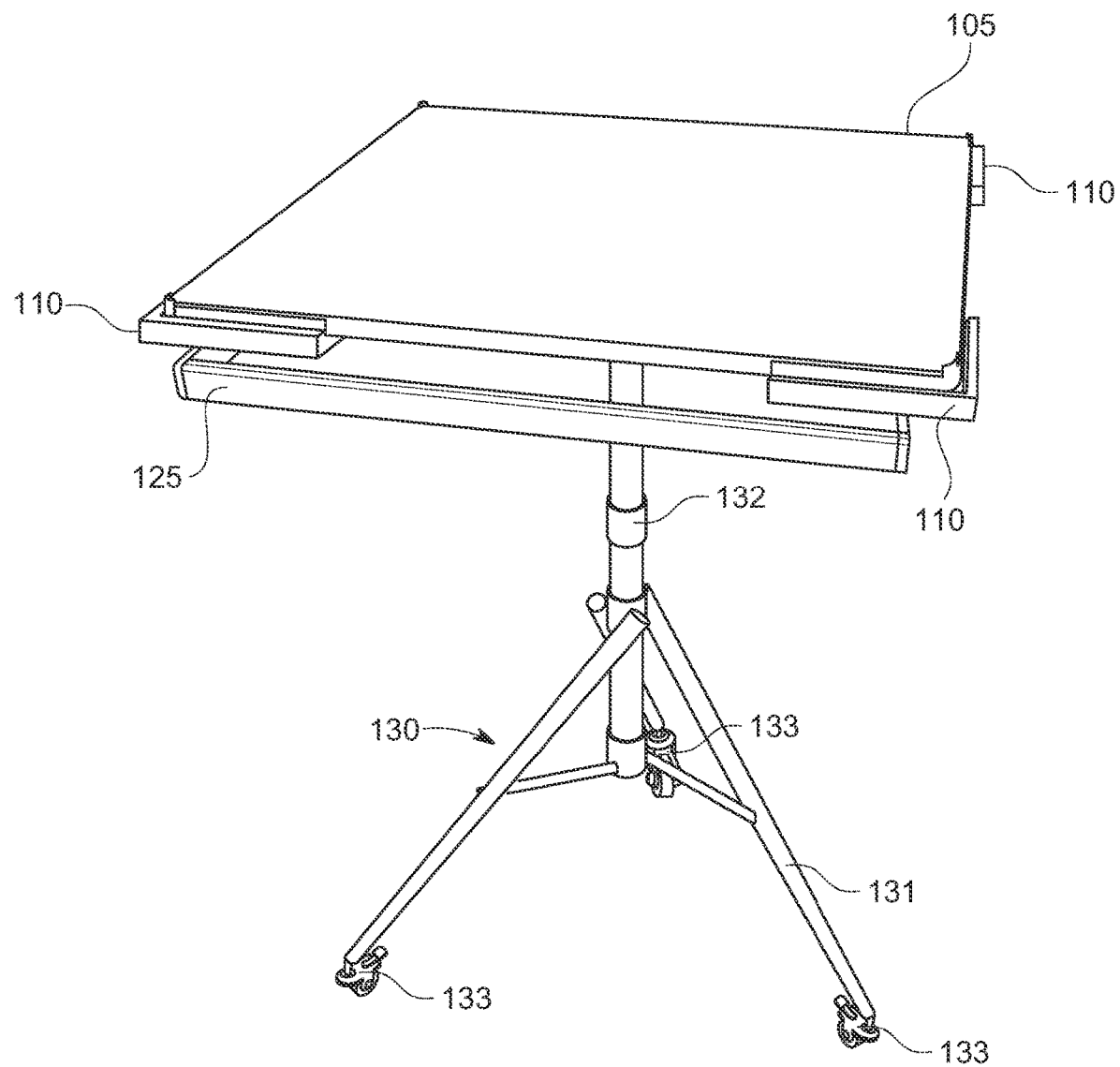
FIGS. 4-7 illustrate a connectable and disconnectable collapsible tripod portion of the photographic backdrop support structure.
Figure 5:
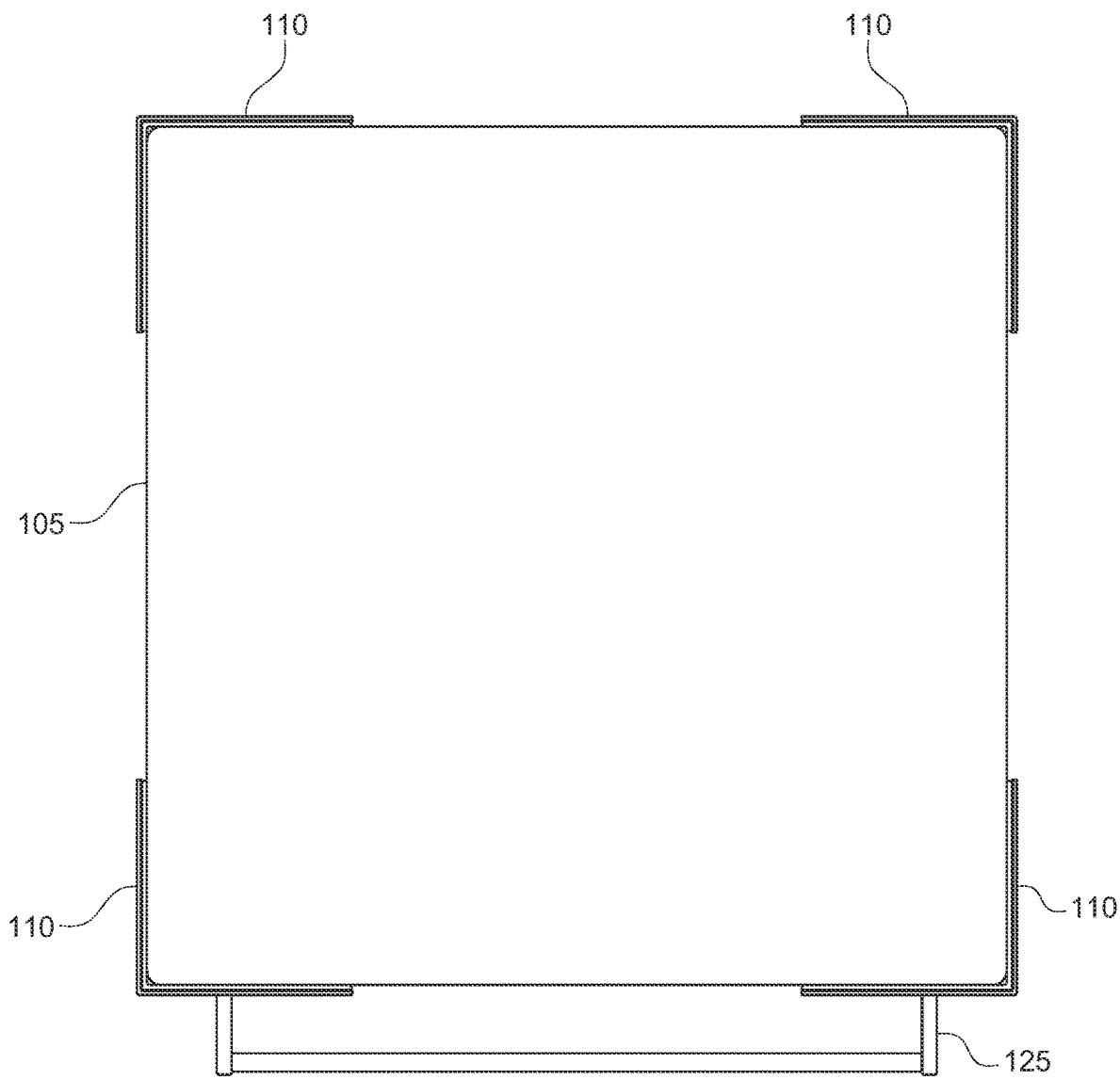
Figure 6:
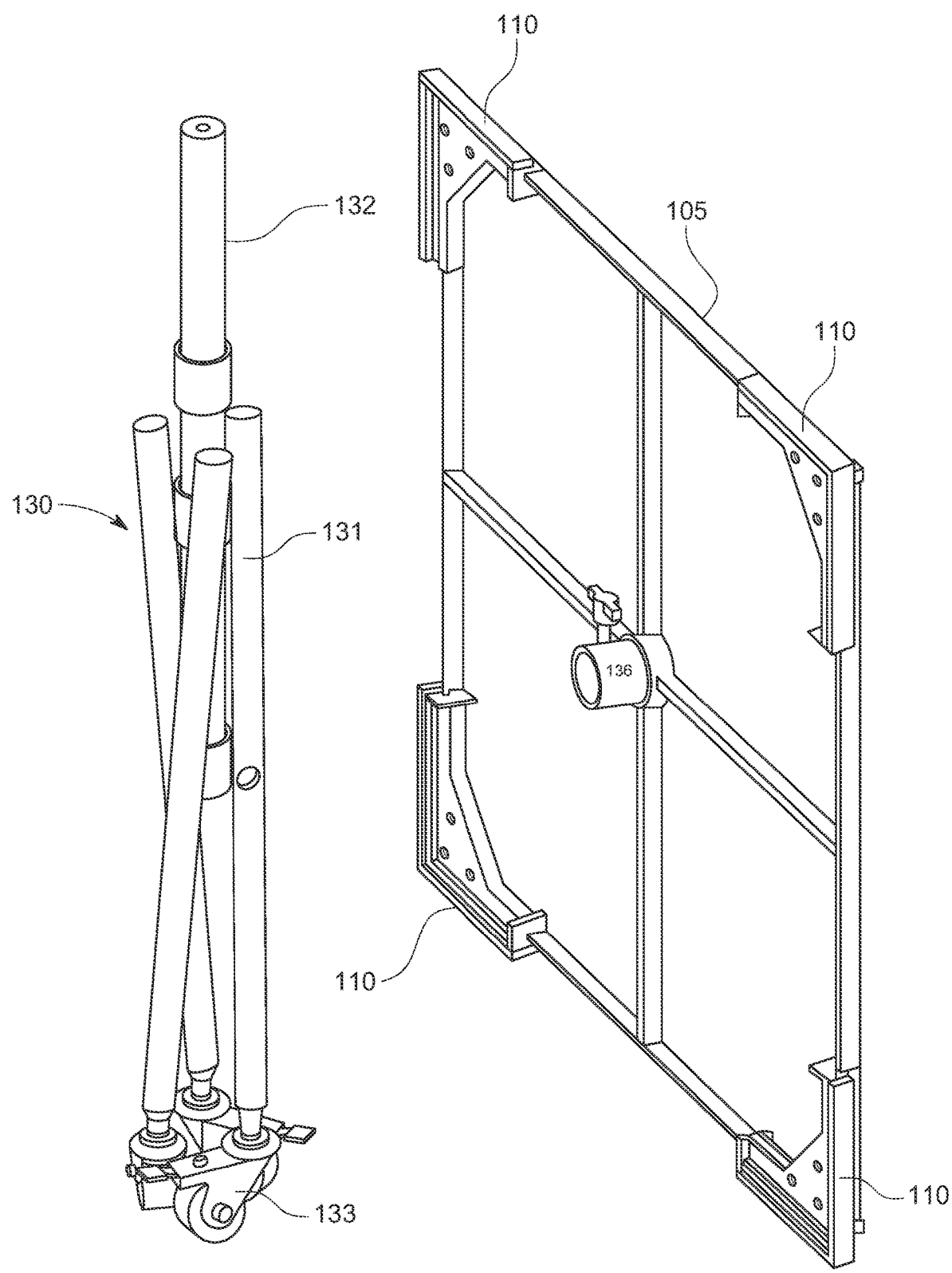
Figure 7:
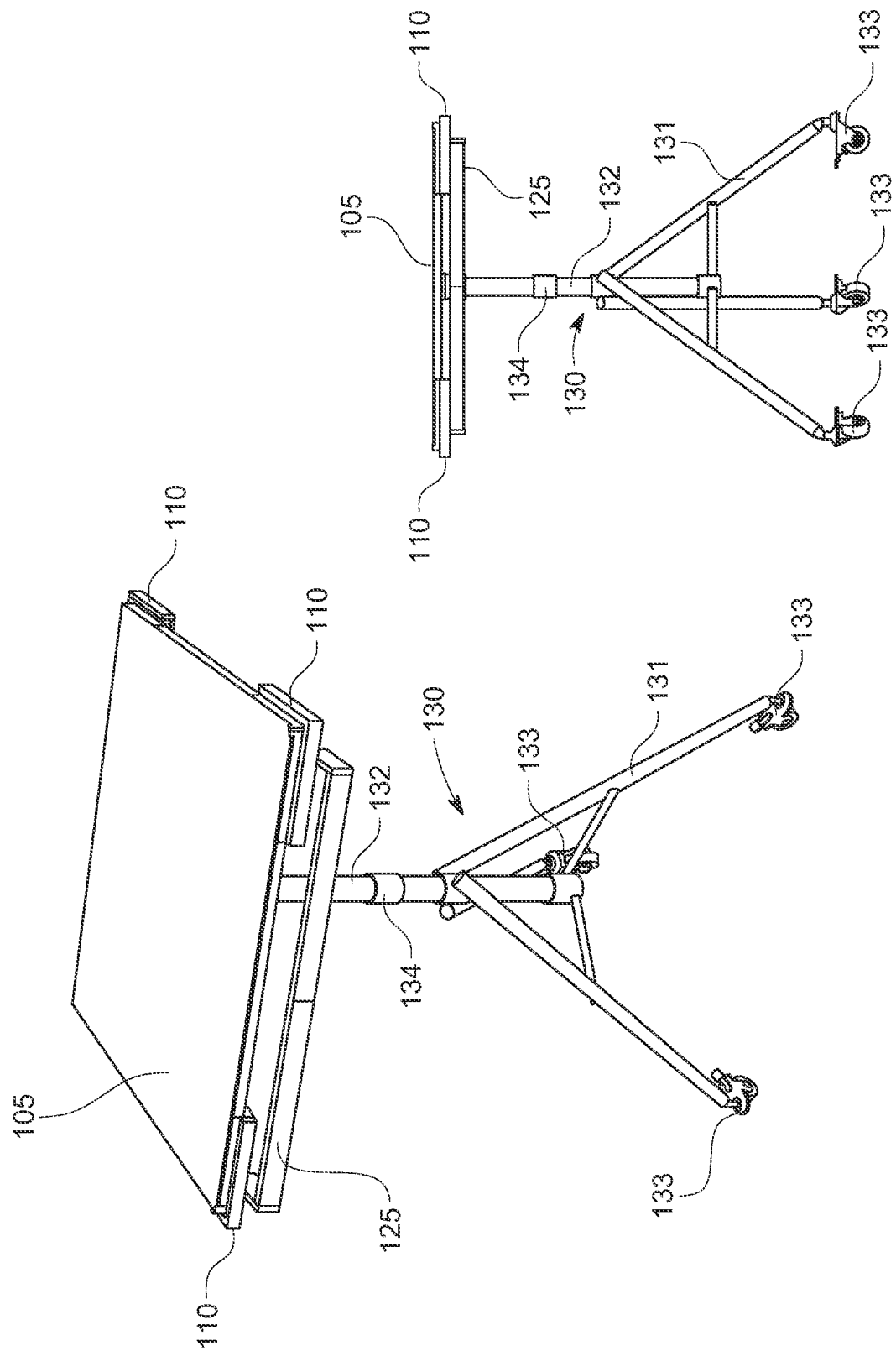
Figure 8:
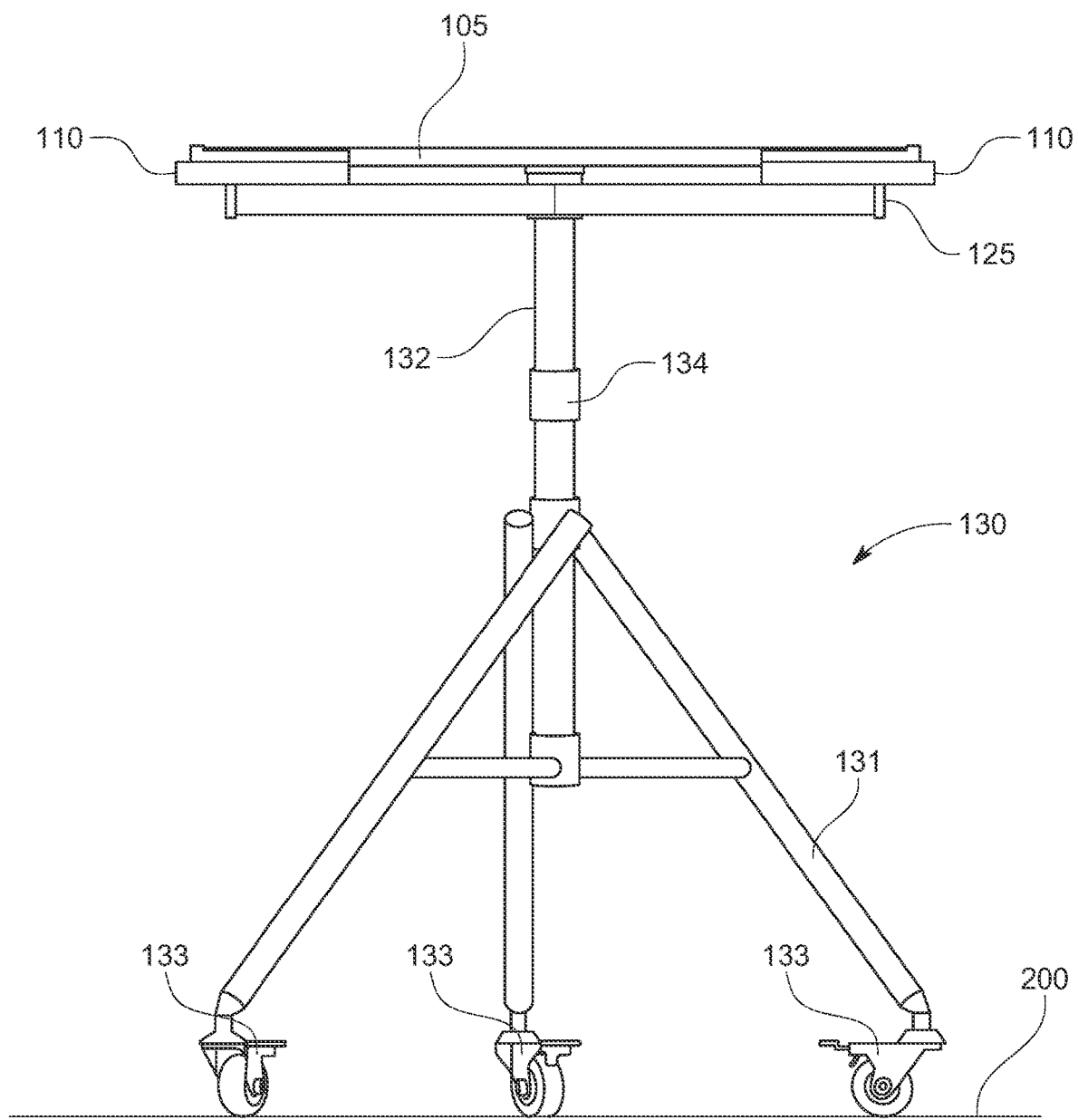
FIG. 8 illustrates an adjustable height of the tripod's center post.

Referring to FIGS. 4-6, the tripod 130 can be connectable and disconnectable from the base 105. For example, the base can include a lockable receptacle 136 (FIG. 6) for receiving and securing the central post 132 of the tripod 130 (see also FIG. 11). The tripod 130 can also be collapsible as shown in FIG. 6 and can be mobile including lockable wheels 133. The height of the base 105 relative to the ground surface 200 can be adjustable. For example, referring to FIG. 8, the height of the tripod's 130 center post 132 can be adjustable using a locking collar 134 to change the height of the base 105 relative to a ground surface 200.

Referring to FIGS. 1-5 and 7-12, the support structure 100 can further include a handle 125. The handle 125 can be attached, attachable, disconnectable, and/or coupled to the support structure 100. Preferably, the handle 125 can be connectable and disconnectable to the support structure 100. For example, the handle 125 can be connected to, connectable to, and/or disconnectable from the base 105 or brackets 110, for example.

Figure 9:
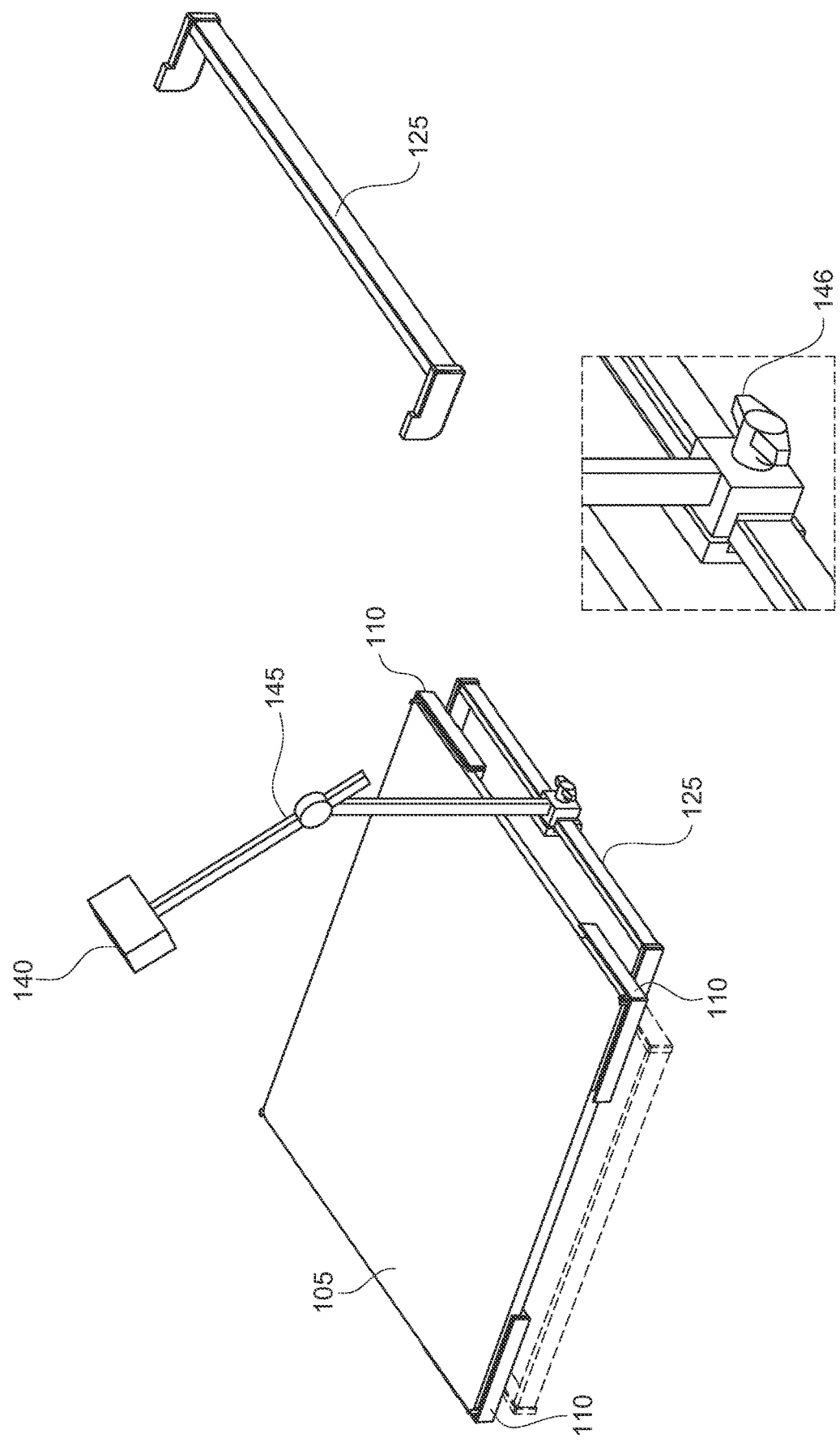
Figure 10:
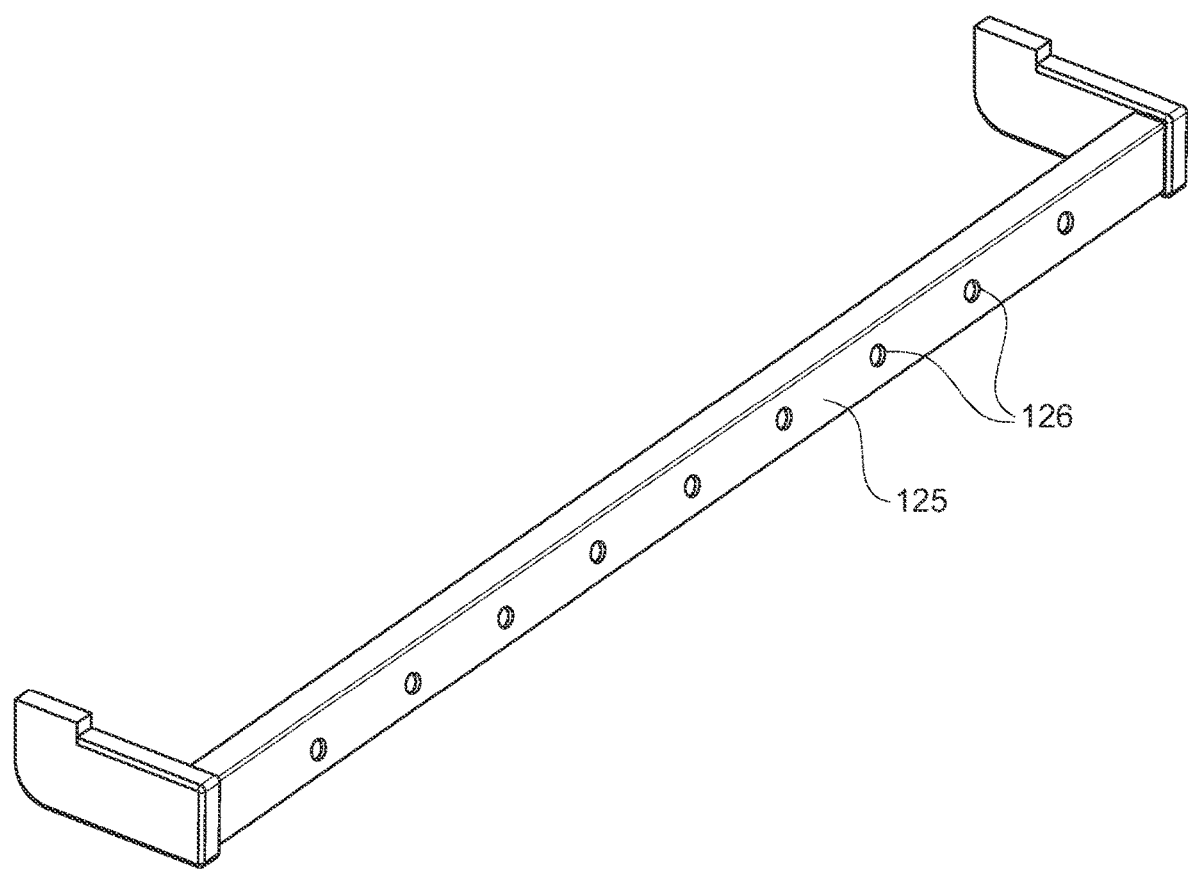

Referring to FIGS. 9 and 10, the handle 125 can be configured to support an accessory 140. The accessory 140 can include a light, phone, and/or camera, for example. An accessory support 145 can further include a clamp 146 as illustrate in FIG. 9 that is connectable and disconnectable to different sides of the base 105.

FIG. 10 illustrates a handle 125 with pre-drilled holes 126 for attachment of the accessory support 145. The holes 126 can be designed to be bottom-facing (not shown) such that they are not visible during photography. Other embodiments may include a single drillhole 126, no drill holes 126, or any number of drillholes 126.

Figure 11:
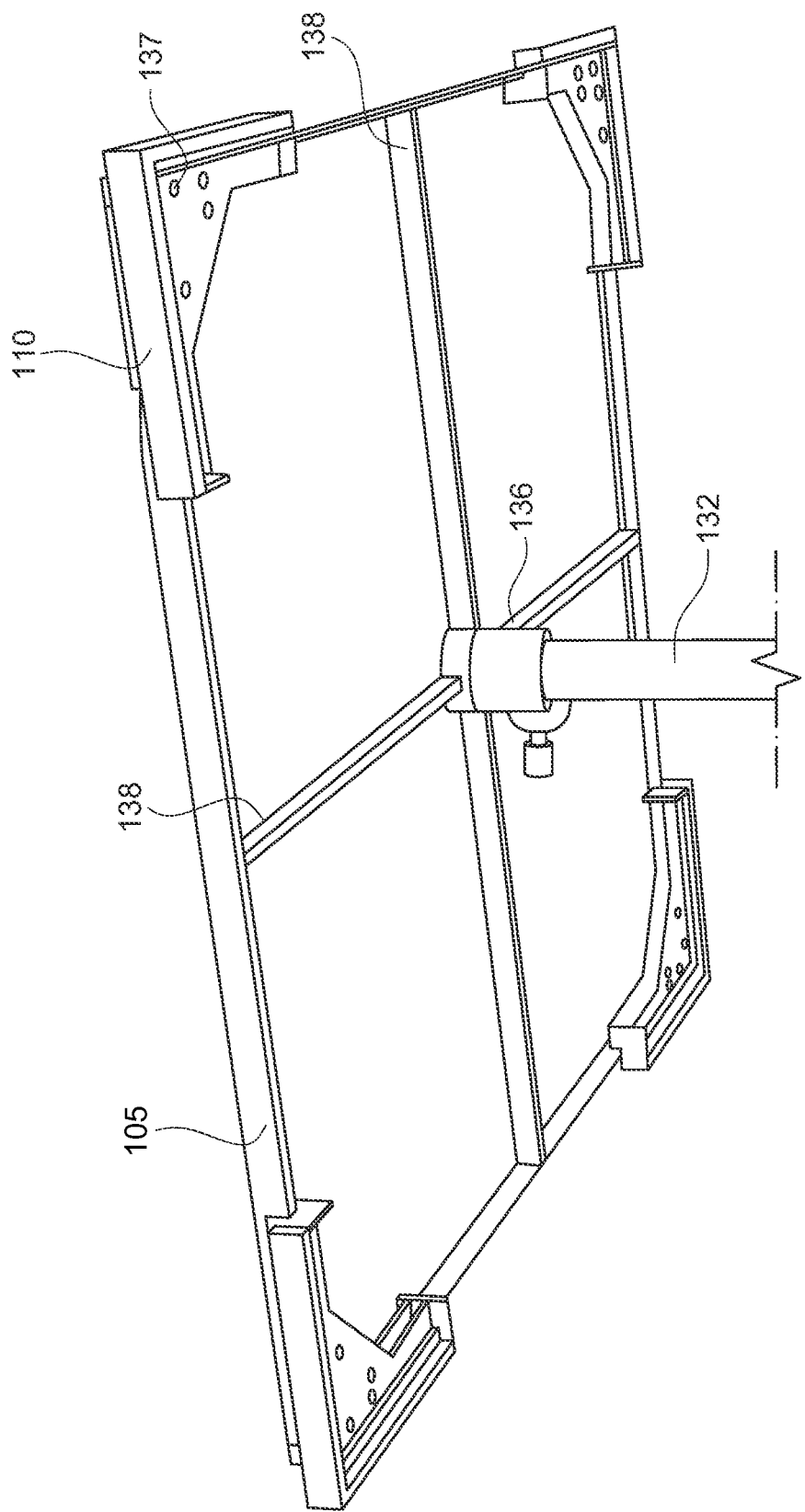

FIG. 11, illustrates an embodiment where the brackets 110 include threaded inserts 137 to secure to and support the accessory support 145. FIG. 11 also illustrates rib reinforcements 138 for reinforcing the rigidity of the base 105.

Figure 12:
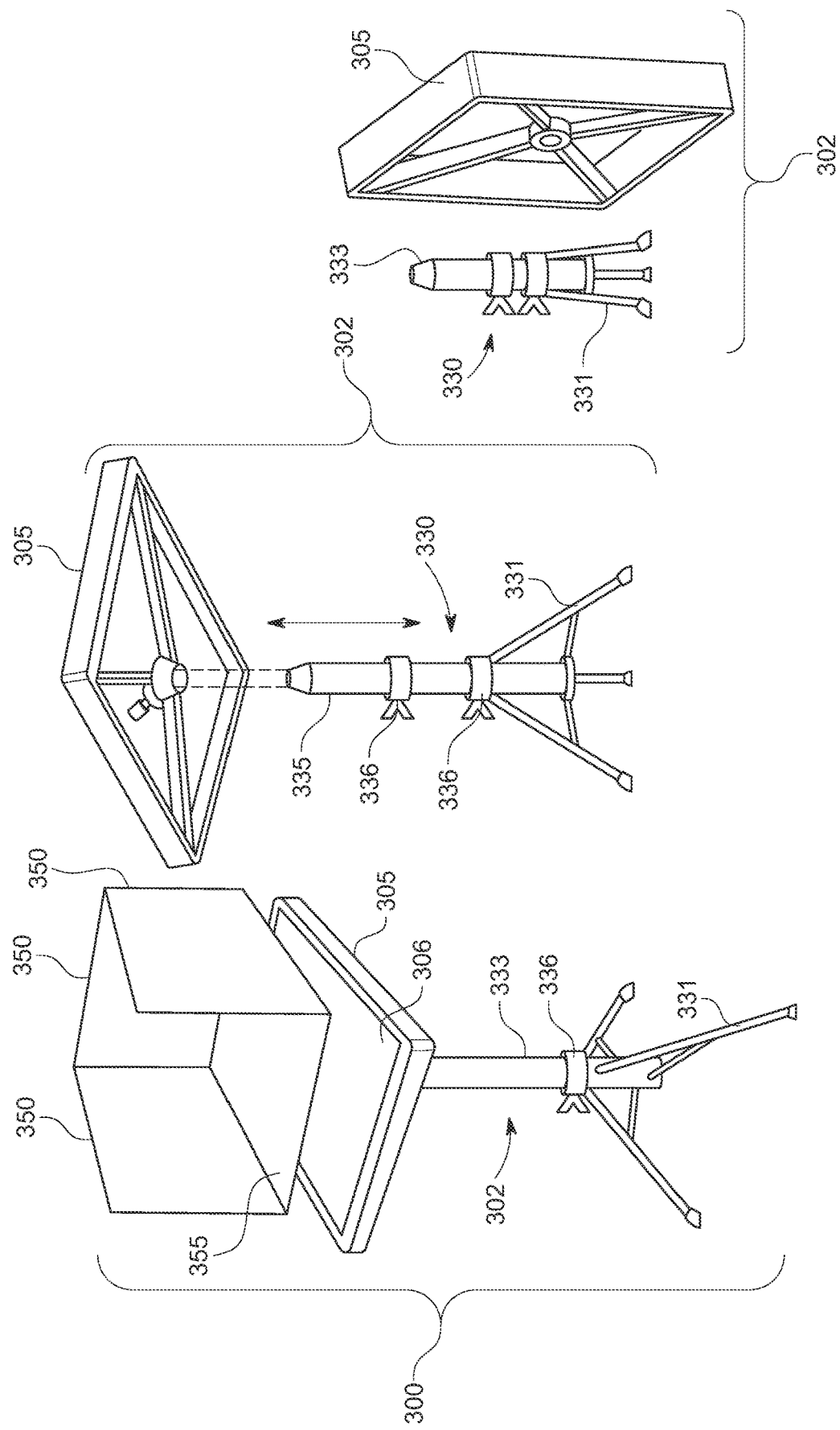

FIG. 12, illustrates an embodiment of a backdrop system 300 that includes a support structure 302 with a tripod 330 which is further collapsible via two lockable collars 336. The tripod can include support legs 331 which are lockably coupleable to the vertical support 333 and collapsible there against. Other embodiments do not have supports at a bottom of the table. For example only a 5 mm thick piece of aluminum without additional supports below can be disposed below a base according to some embodiments of the present invention.

According to this embodiment the vertical panels 350 and the horizontal panel 355 are connected together. According to some embodiments, the vertical panels 350 and horizontal panel 355 can be unitarily formed.

The base structure 305 can include a recessed central receptacle 306 for receiving and positioning the connected vertical panel 350 and horizontal panel 355

Figure 13:
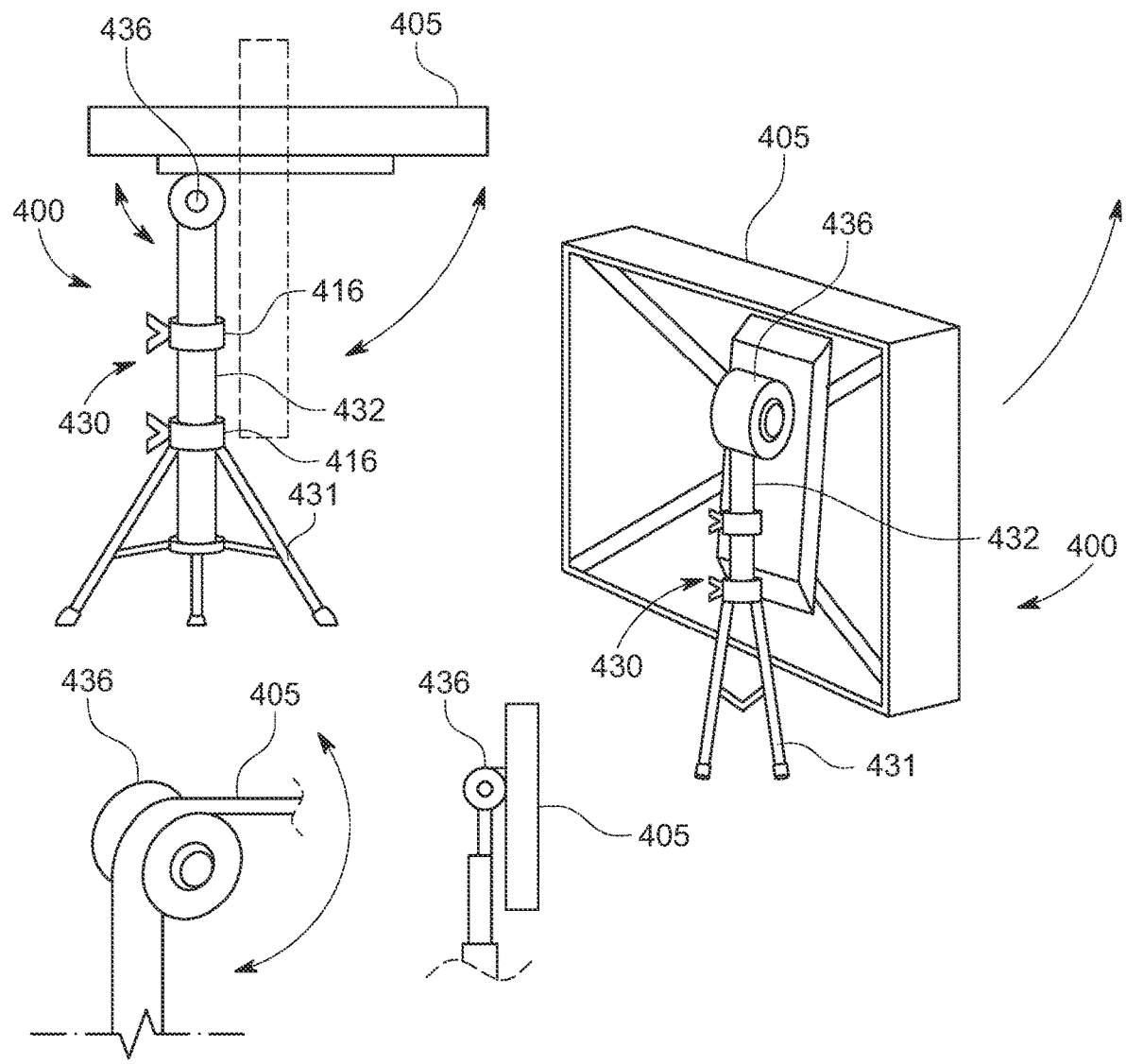
FIG. 13 illustrates an alternative design of a support structure where the base table support element is pivotable to the vertical support element of the tripod.

FIG. 13 illustrates an alternative design of a support structure 400 where the base table support element 405 is pivotable to the vertical support element 432 of the tripod 430. The support structure 400 with the tripod 430 is further collapsible via two lockable collars 416. The tripod 430 includes support legs 431 which are lockably coupleable to the vertical support 433 and collapsible there against.

Figure 14:
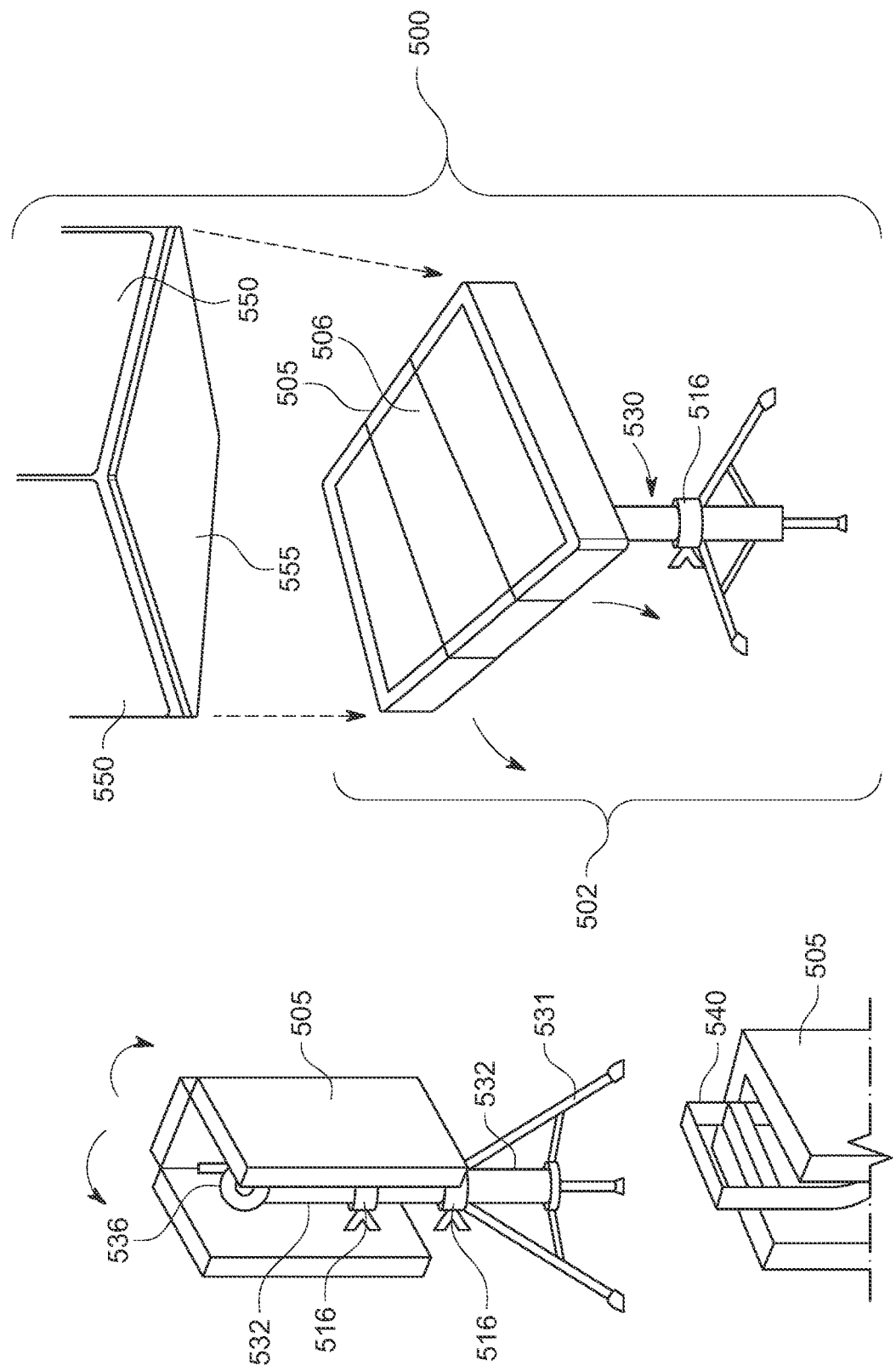
FIG. 14 illustrates an embodiment of a backdrop system having a support structure where the base is foldable for increased portability.

FIG. 14 illustrates another embodiment of ab backdrop system 500 having a support structure 502 where the base 505 is foldable for increased portability. The support structure 502 with the tripod 530 is further collapsible via two lockable collars 516. The tripod 530 includes support legs 531 which are lockably coupleable to the vertical support 533 and collapsible there against.

The support structure 502 has a foldable base table support element 505 that is pivotable relative to the vertical support element 532 of the tripod 530 via a rotatable coupling 536. The support structure 502 with the tripod 530 is further collapsible via two lockable collars 516.

The backdrop system 500 can further include connected or integral vertical backdrops 550 and horizontal backdrop 555 forming two or more sides of an open box-shaped backdrop.

Figure 15:
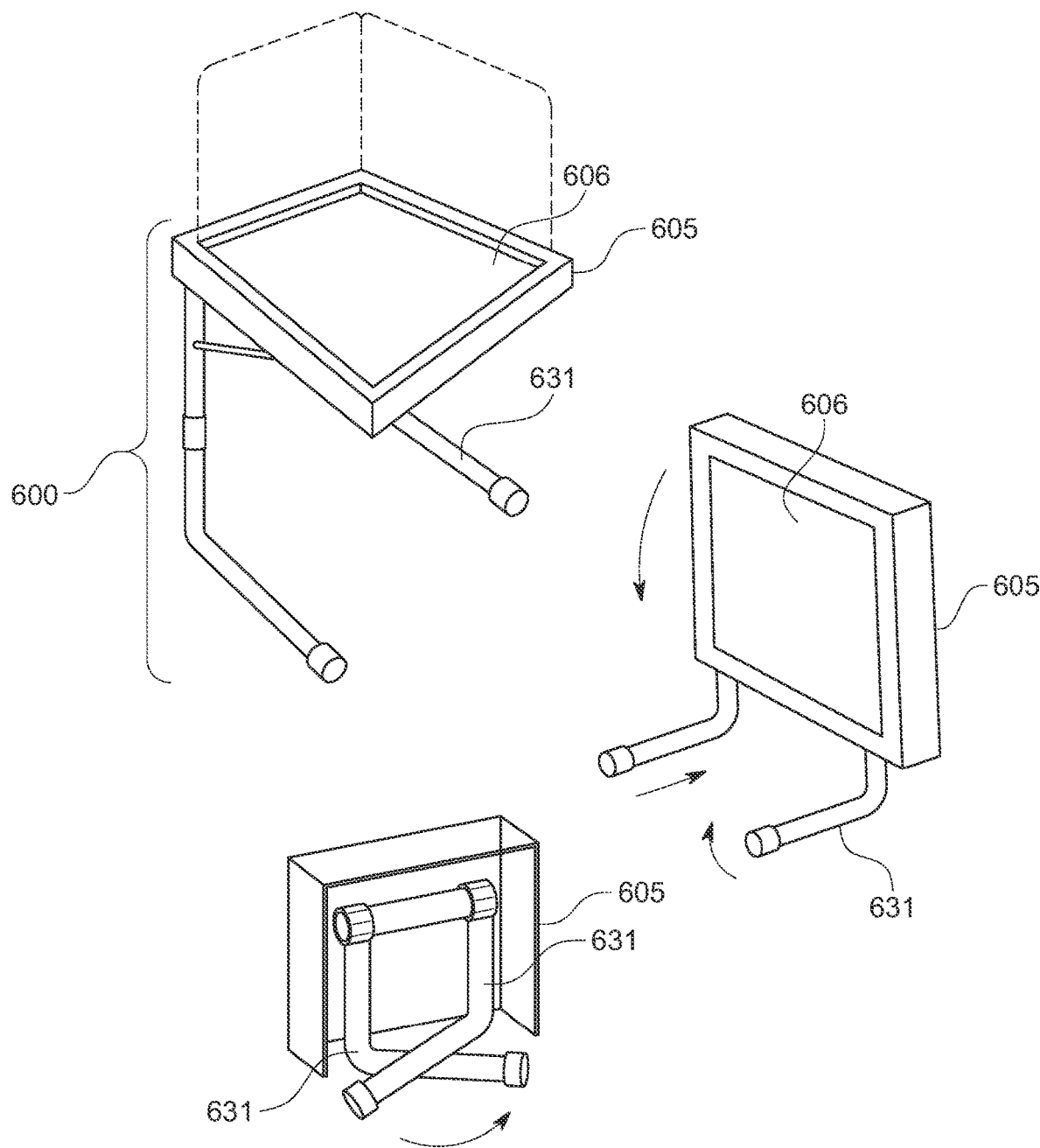
FIG. 15 illustrates an example of another embodiment of a support structure with two foldable legs.

FIG. 15 illustrates an example of another embodiment of a support structure 600 with two foldable legs 631 and a base support structure 605. As illustrated the base structure 605 can include a receptacle 606 for receiving a plurality of backdrop panels as illustrated by broken lines.

Figure 16:
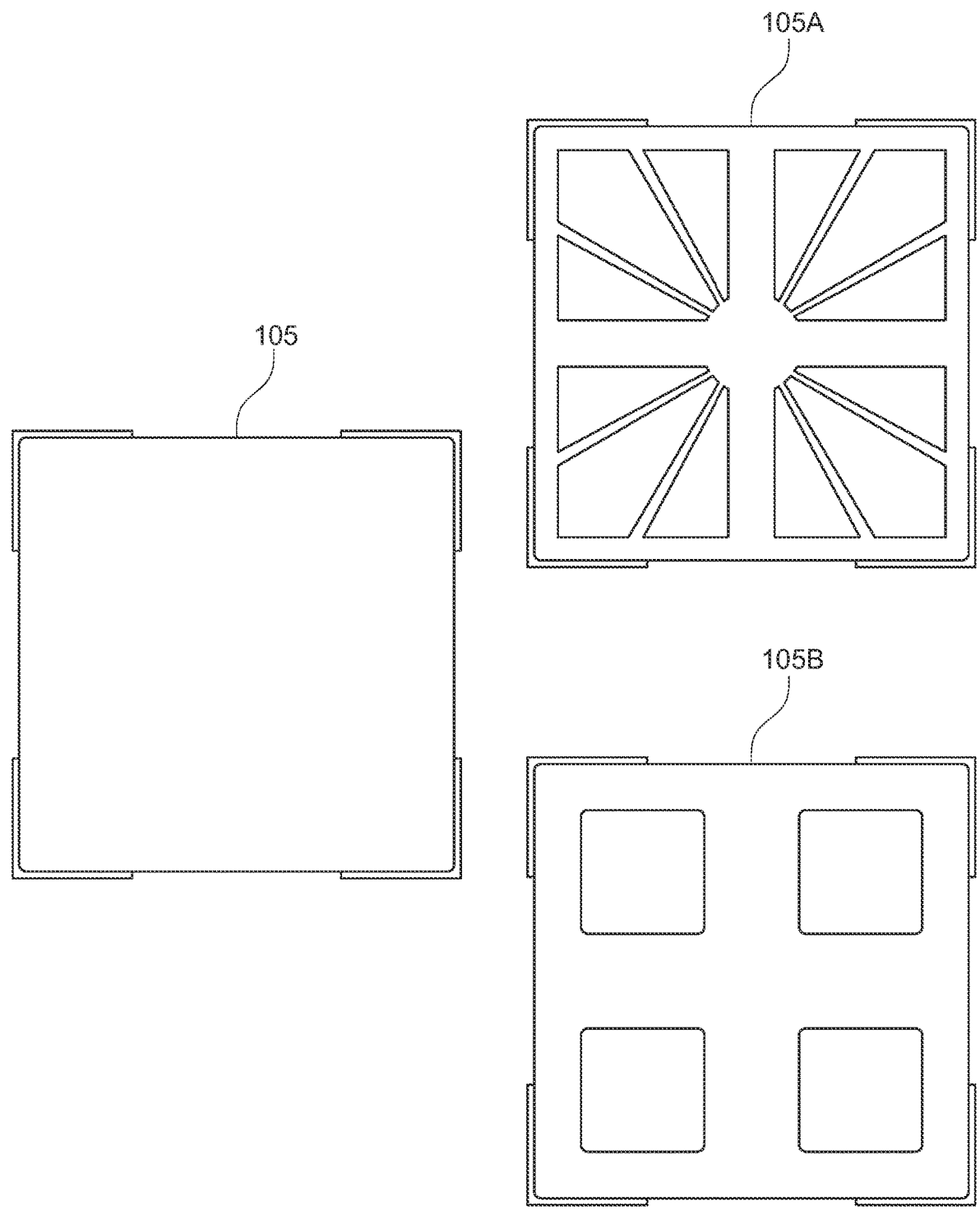
FIG. 16 illustrates different variations of base designs and with radial and tiled cutouts, for example to reduce the weight of the base.

FIG. 16 illustrates different variations of base designs 105A and 105B with radial and tiled cutouts, for example to reduce the weight of the base 105.

Figure 17:
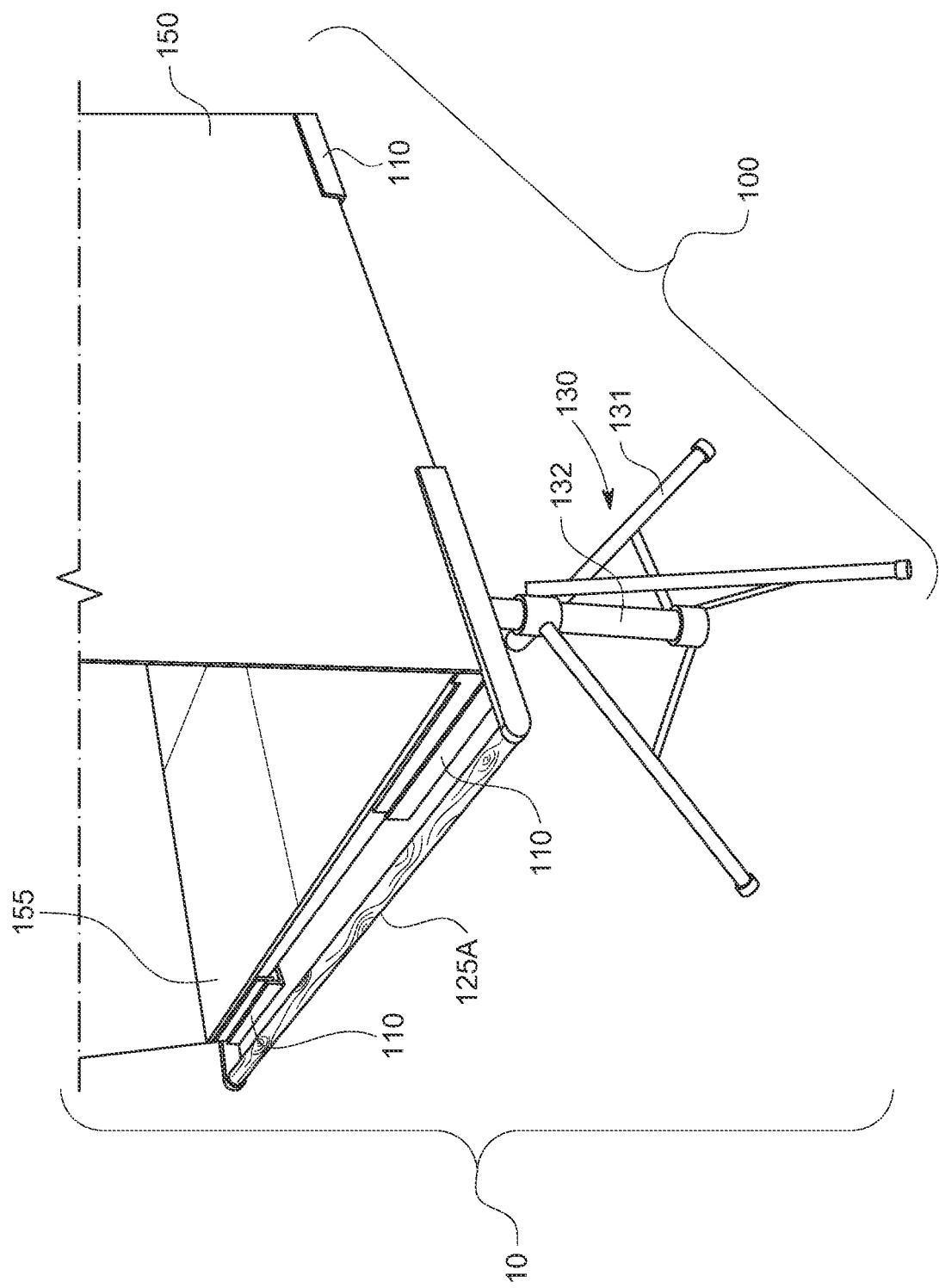
FIG. 17 illustrates an example of a wood handle.

FIG. 17 illustrates an example of a wood handle 125A.

Figure 18:
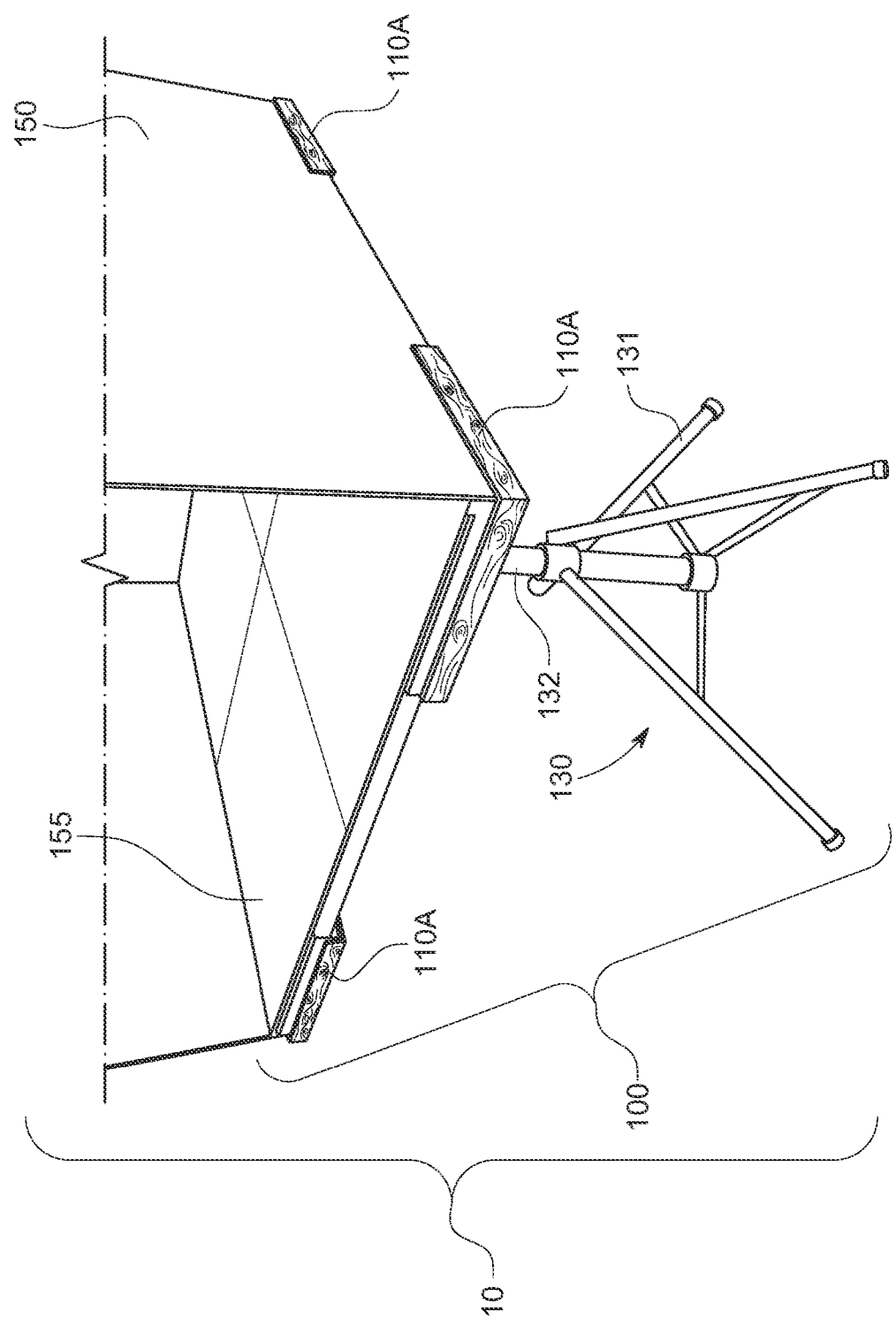
FIG. 18 illustrates an example of a wood bracket.

FIG. 18 illustrates an example of a wood bracket 110A.

Figure 19:
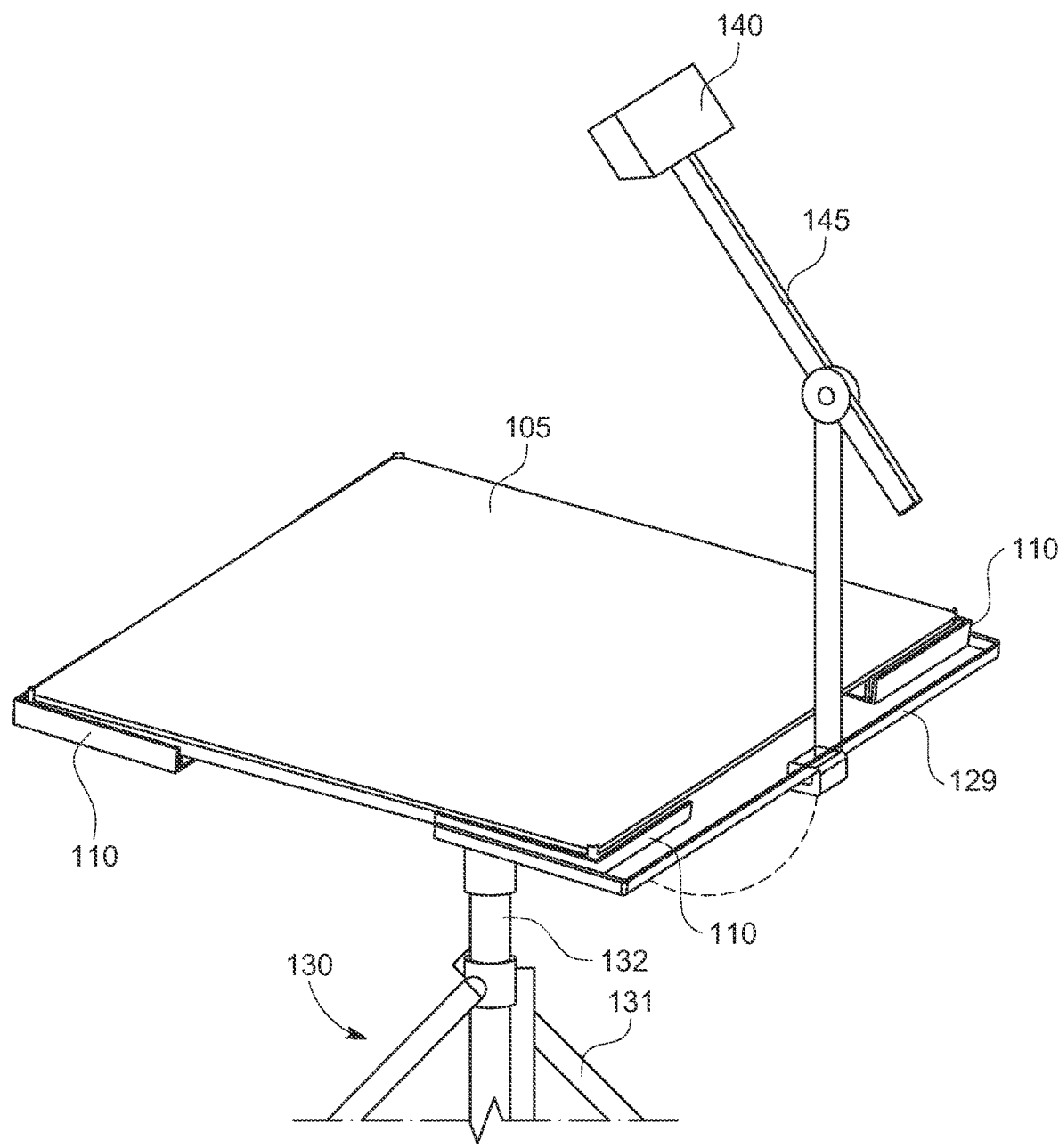
FIG. 19 illustrates an example where an accessory bar may be affixed to a handlebar or the central post of the tripod.

FIG. 19, illustrates an example where an accessory bar 145 may be affixed to a handlebar 129 or the central post 132 of the tripod 130.

Figure 20:
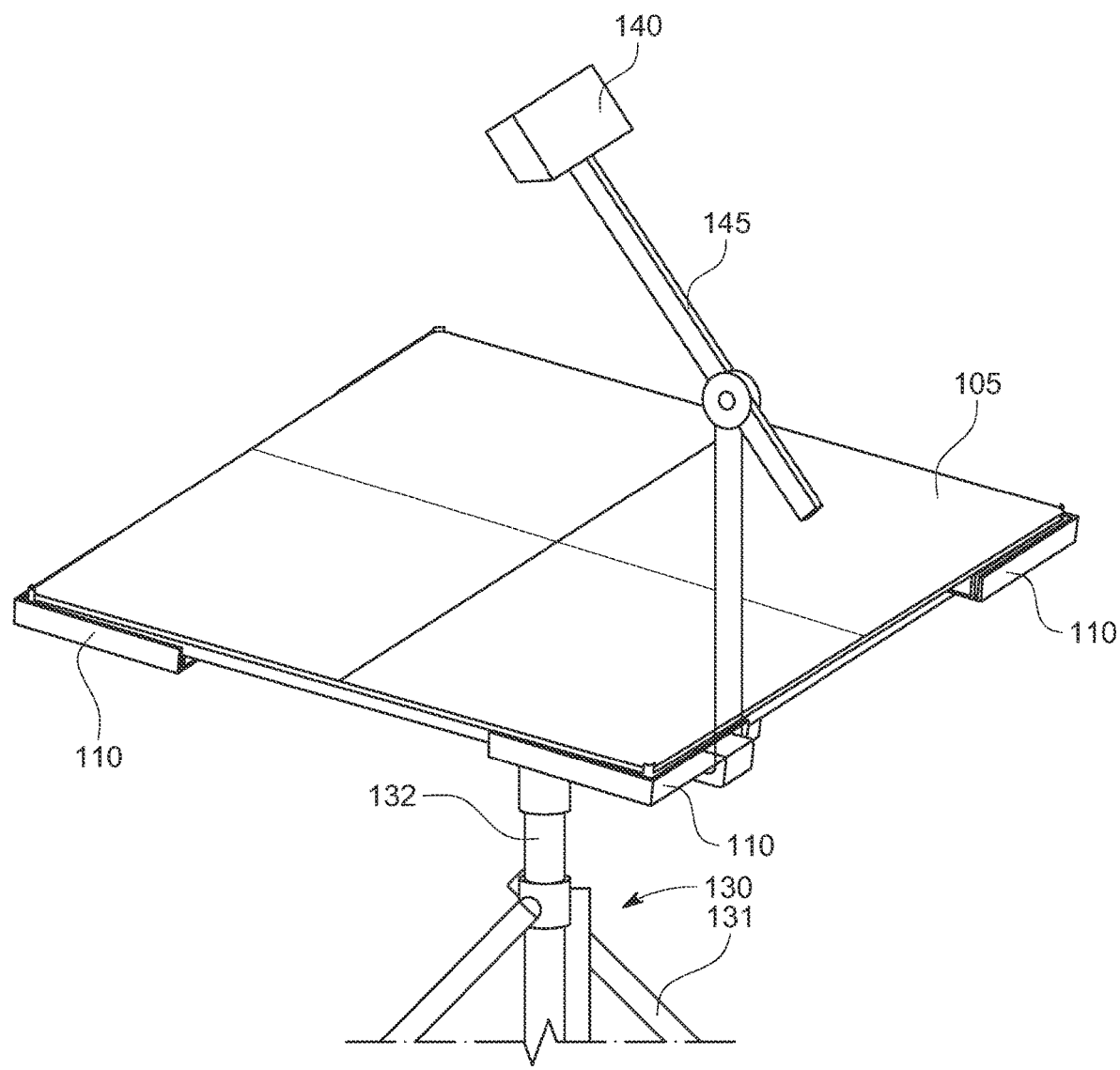
FIG. 20 illustrates an example where the accessory support is attached to the corner bracket.

FIG. 20 illustrates an example where the accessory support 145 is attached to the corner bracket 110.

Referring to FIGS. 21-24, a backdrop system 60 is illustrated according to an embodiment of the invention. The backdrop system 60 includes a support structure 600 configured to support a horizontal panel 155 and one or more vertical panels 150 during photography. The support structure 600 includes a base 605 for supporting the horizontal panel 155 and the vertical panels 150. The support structure 600 further includes a tripod stand 130.

The base 605 includes a recessed portion 605A and a perimeter portion 605B for receiving and aligning the horizontal panel 155 and vertical panels 150 relative to the base 605 portions 605A and 605B. The base 605 further comprises brackets 610 extending below the base 605 portions 605A and 605B. In this embodiment eight brackets 610 connect the recessed portion 605A to the perimeter portion 605B and maintain four perimeter slots 620 between the recessed portion 605A and perimeter portion 605B for supporting the plurality of vertical panels 150.

Figure 21:
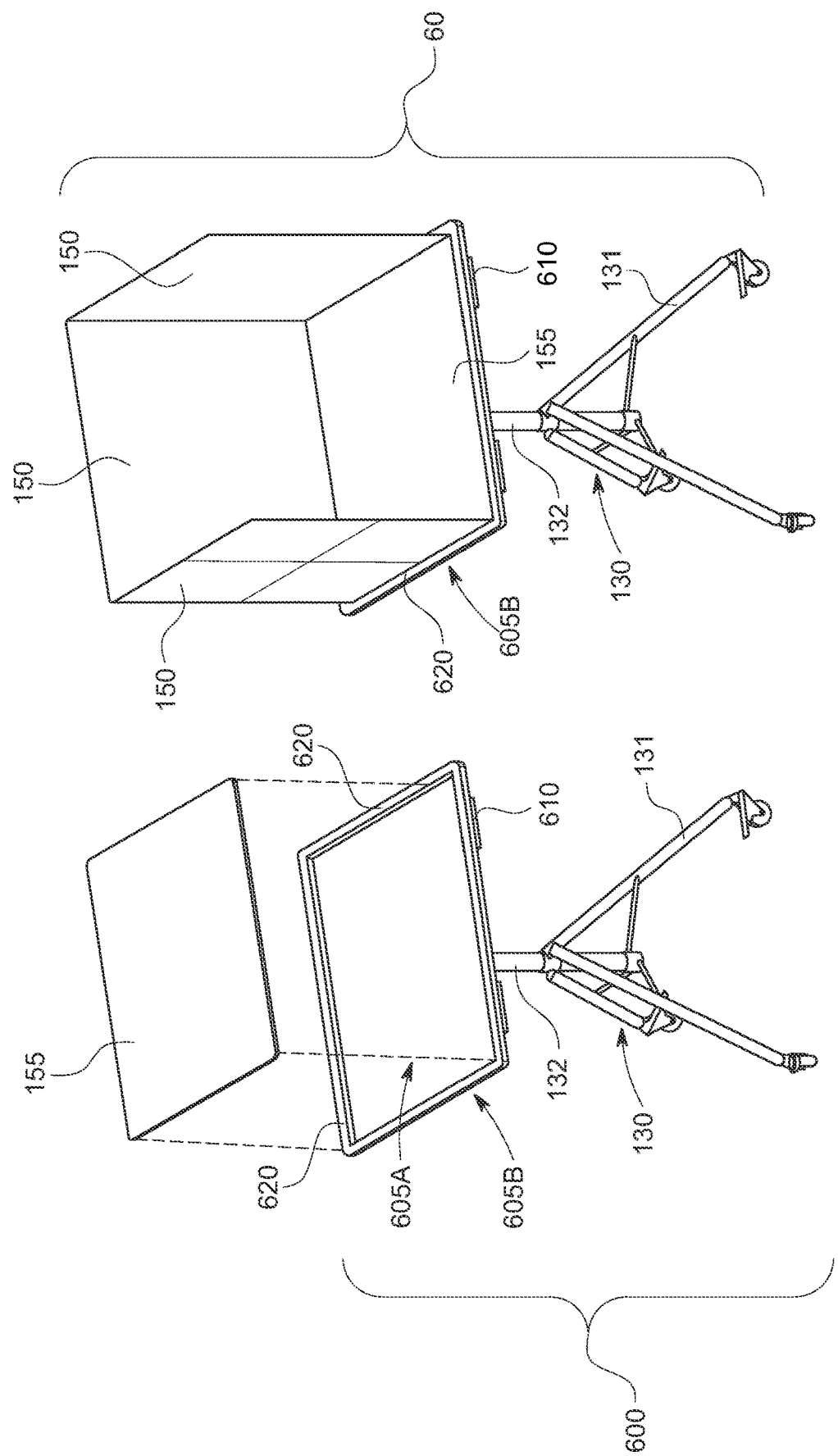
FIGS. 21-24 illustrate an additional backdrop system with a support structure configured to support a horizontal panel and one or more vertical panels during photography.
Figure 22:
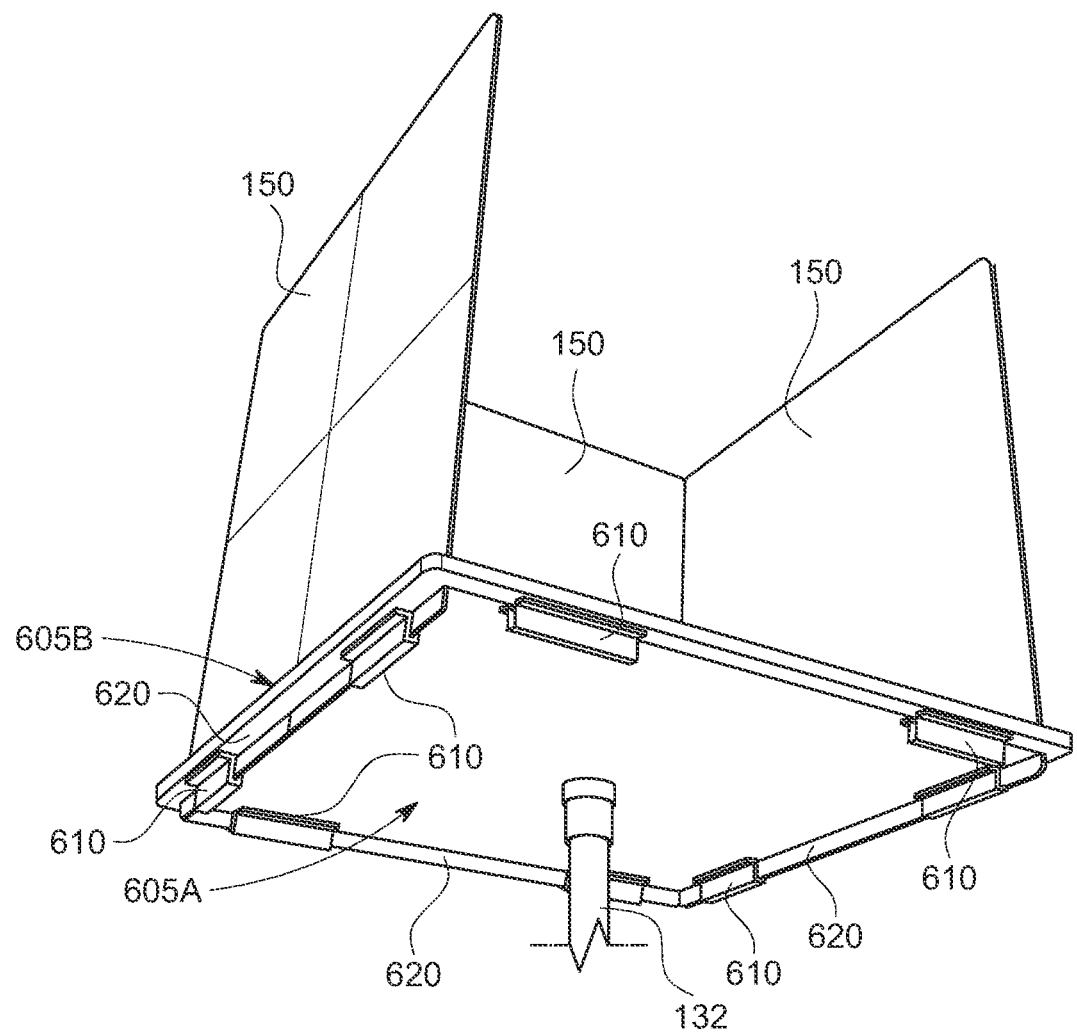

The brackets 610 maintain sunken slots 620 for insertion of the vertical panels 150 relative to the base 605, relative to the horizontal panel 155, and relative to adjacent perpendicularly placed vertical panels 150 as shown in FIGS. 21-24. Two vertical panels 150 extending perpendicular to each other create a corner for photography when placed in the slots 620. As shown in FIG. 21, the slots 620 extending below the base support 605 to align the edge of the horizontal panel 155 with the vertical panel 150 disposed therein. The portion of the brackets 610 extending along one or more sides of the base 605 structure being recessed below a bottom of the recessed portion 605A and perimeter portion 605B of the base 605 structure.

Figure 23:
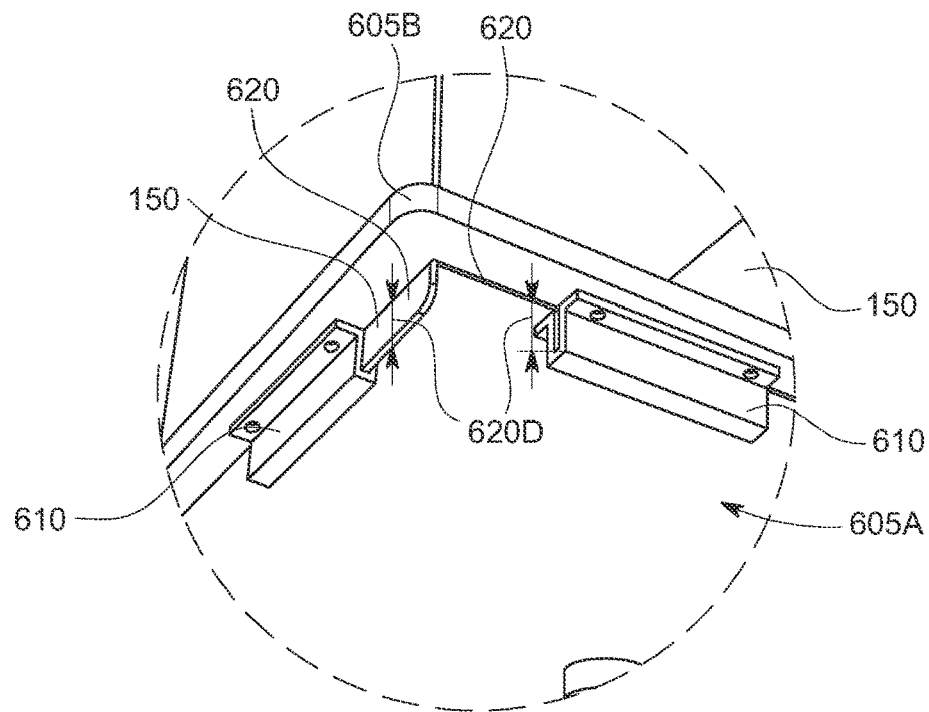
Figure 24:
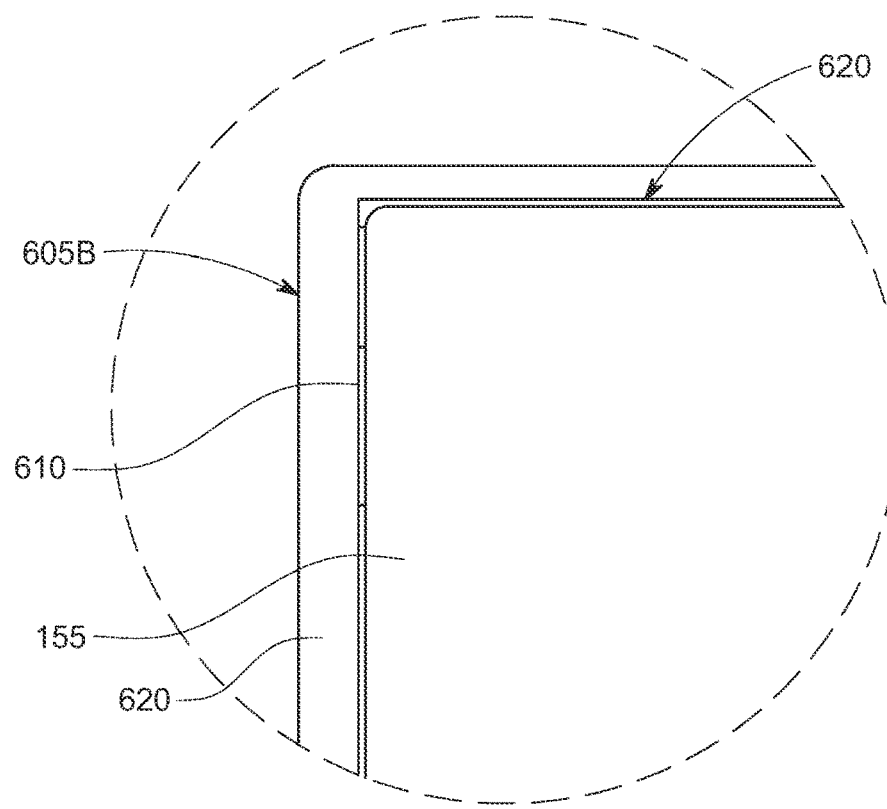

As shown in FIG. 23, the depth 620D of the slots 620 is defined by the depth of the brackets 610 and thickness of the recessed portion 605A and thickness of the perimeter portion 605B extends below a bottom surface of the base portions 605A and 605B and can have a depth 620D sufficient for aligning the supported vertical panels 150 relative to other perpendicular vertical panels 150, relative to the horizontal panel 155, and corresponding to a width of the vertical panels 150 to prevent the slots 620 from being seen during photography. Depth 620D can be between about 10 and 40 millimeters, between about 20 and 30 millimeters, about 20 millimeters, and/or about 25 millimeters.

The support structure 600 can include one or more legs extending therefrom. The one or more legs can be part of the tripod 130 in some embodiments. The tripod 130 including three legs 131 and a central post 132 for attaching the tripod 130 to the base 105 as shown and previously discussed.

One skilled in the art will appreciate in view of this disclosure that, for this and other apparatus, systems, processes and methods disclosed herein, the elements, components, and steps may be implemented in differing order. Moreover, the structures of apparatus may be reorganized or variated to accomplish a given feature or function. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A support structure for a photographic backdrop system, the support structure configured to support a horizontal backdrop panel and one or more vertical backdrop panels during photography, the support structure comprising:
    a base for supporting a bottom surface of the horizontal backdrop panel;
    a plurality of slots disposed about a periphery of the base, the plurality of slots configured to locate and support the one or more vertical backdrop panels;
    the base including brackets disposed on two or more corners for receiving and aligning the horizontal panel relative to the base, the brackets comprising the plurality of slots configured to locate and support the one or more vertical backdrop panels;
    the brackets including a corner fitting extending from a top surface of the brackets, the corner fitting aligning the horizontal panel when the horizontal panel is placed upon the base; and
    each slot extending from a respective corner fitting of a respective bracket along two perpendicular edges of the base for supporting two vertical panels.

2. The photographic backdrop system comprising the support structure for the photographic backdrop system according to claim 1, the photographic backdrop system further comprising two vertical backdrop panels and the horizontal backdrop panel, the two vertical backdrop panels supported by the support structure, the two vertical panels extending perpendicular to one another and perpendicular to the horizontal backdrop panel to create a corner scene for photography.

3. The support structure for the photographic backdrop system according to claim 1, each bracket further comprising two sunken slots extending below the base.

4. The support structure for the photographic backdrop system according to claim 3, the sunken slots of the brackets extending along two perpendicular edges of the base.

5. The support structure for the photographic backdrop system according to claim 4, the sunken slots being recessed below a top of the base.

6. The support structure for the photographic backdrop system according to claim 1, further comprising one or more support legs extending from the base.

7. The support structure for the photographic backdrop system according to claim 1, the support structure comprising a tripod support structure coupled to a bottom of the base, the tripod including three legs.

8. The support structure for the photographic backdrop system according to claim 7, the tripod being connectable to and disconnectable from the base.

9. A system for photography comprising:
    the support structure according to claim 1;
    the horizontal panel; and
    the one or more vertical panels.

10. The system for photography according to claim 9, a surface of the horizontal and vertical panels having the appearance of wood, stone, smoke, marble, clay, tile, slate, concrete, sandstone, cement, plaster, linen, or lights.

11. A method of using the system for photography of claim 9, comprising:
    assembling the support structure by expanding and connecting one or more legs to a base; and
    assembling the horizontal panel and one or more vertical panels with the base to create a backdrop scene for the photography.

12. A support structure for a photographic backdrop system, the support structure configured to support a horizontal backdrop panel and one or more vertical backdrop panels during photography, the support structure comprising:
    a base for supporting a bottom surface of the horizontal backdrop panel;
    a plurality of slots disposed about a periphery of the base, the plurality of slots configured to locate and support the one or more vertical backdrop panels;
    the base including brackets disposed on two or more corners for receiving and aligning the horizontal panel relative to the base, the brackets comprising the plurality of slots configured to locate and support the one or more vertical backdrop panels;
    the brackets including a corner fitting extending from a top surface of the brackets, the corner fitting aligning the horizontal panel when the horizontal panel is placed upon the base; and
    a height of the corner fitting extending above a top surface of the base corresponding to a width of the horizontal panel.

13. The support structure for the photographic backdrop system according to claim 12, the height of the corner fitting being between about 1 millimeter and 10 millimeters.

14. The support structure for the photographic backdrop system according to claim 12, the height of the corner fitting being between about 2 millimeters and 3 millimeters.

15. A support structure for a photographic backdrop system, the support structure configured to support a horizontal backdrop panel and one or more vertical backdrop panels during photography, the support structure comprising:
- a base for supporting a bottom surface of the horizontal backdrop panel;
- a plurality of slots disposed about a periphery of the base, the plurality of slots configured to locate and support the one or more vertical backdrop panels; and
- a connectable and disconnectable handle.

16. The support structure for the photographic backdrop system according to claim 15, wherein the handle is configured to support an accessory.

17. The support structure for the photographic backdrop system according to claim 16, wherein the accessory includes a light and/or camera.

18. A support structure for a photographic backdrop system, the support structure configured to support a horizontal backdrop panel and one or more vertical backdrop panels during photography, the support structure comprising:
- a base for supporting a bottom surface of the horizontal backdrop panel; and
- a plurality of slots disposed about a periphery of the base, the plurality of slots configured to locate and support the one or more vertical backdrop panels;
- the base comprising:
  - a recessed portion;
  - a perimeter portion; and
  - brackets extending below the base recessed and perimeter portions, the brackets connecting the recessed portion to the perimeter portion and maintaining four perimeter slots between the recessed portion and the perimeter portion for receiving and aligning a horizontal backdrop panel relative to at least two vertical backdrop panels.

19. The photographic backdrop support structure according to claim 18, wherein the slots between the recessed portion and the perimeter portion maintained by the brackets are between about 2 and 3 millimeters wide.

20. The photographic backdrop support structure according to claim 18, wherein the brackets maintain a recessed slot for receiving a vertical backdrop panel.

21. A photographic backdrop system comprising the photographic backdrop support structure according to claim 18, further comprising at least one vertical backdrop panel and a horizontal backdrop panel sized to be received and located by the recessed slots and recessed portion of the base, respectively.

22. A photographic backdrop support structure comprising:
- a base for supporting a horizontal backdrop panel and at least one vertical backdrop panel, the base including:
  - one or more sunken slots for receiving an edge of a vertical backdrop panel; and
- at least three brackets, each bracket including:
  - a corner fitting extending above the bracket for aligning a corner of the horizontal backdrop panel; and
  - two sunken slots for receiving an edge of two vertical backdrop panels.

23. The photographic backdrop support structure according to claim 22, wherein the two sunken slots are disposed perpendicular relative to each other around a corner of the base.

24. A photographic backdrop support structure comprising:
- a base comprising:
- a recessed portion;
- a perimeter portion; and
- brackets extending below the recessed portion and perimeter portion, the brackets connecting the recessed portion to the perimeter portion and maintaining four perimeter slots between the recessed portion and the perimeter portion, the four perimeter slots being configured to receive and align a horizontal backdrop panel relative to at least one vertical backdrop panel.

25. The photographic backdrop support structure according to claim 24, wherein the brackets maintain a recessed slot for receiving at least two vertical backdrop panels.

26. A photographic backdrop system comprising the photographic backdrop support structure according to claim 24, further comprising at least two vertical backdrop panels and a horizontal backdrop panel sized to be received and located by the recessed slots and recessed portion of the base, respectively.

* * * * *